(12) United States Patent
Derelöv et al.

(10) Patent No.: US 12,408,748 B2
(45) Date of Patent: Sep. 9, 2025

(54) SET OF PANELS WITH A MECHANICAL LOCKING DEVICE

(71) Applicant: Välinge Innovation AB, Viken (SE)

(72) Inventors: Peter Derelöv, Helsingborg (SE); Johan Svensson, Nyvång (SE)

(73) Assignee: VÄLINGE INNOVATION AB, Viken (SE)

( * ) Notice: Subject to any disclaimer, the term of this patent is extended or adjusted under 35 U.S.C. 154(b) by 393 days.

(21) Appl. No.: 17/886,517

(22) Filed: Aug. 12, 2022

(65) Prior Publication Data

US 2023/0148747 A1 May 18, 2023

Related U.S. Application Data

(63) Continuation of application No. 16/553,325, filed on Aug. 28, 2019, now Pat. No. 11,445,819.

(30) Foreign Application Priority Data

Aug. 30, 2018 (SE) ..................... 18510289

(51) Int. Cl.
*F16B 12/24* (2006.01)
*A47B 47/04* (2006.01)
(Continued)

(52) U.S. Cl.
CPC ............ *A47B 47/042* (2013.01); *F16B 12/20* (2013.01); *F16B 12/24* (2013.01); *A47B 47/0066* (2013.01);
(Continued)

(58) Field of Classification Search
CPC .......... F16B 12/10; F16B 12/12; F16B 12/20; F16B 12/24; F16B 2012/103;
(Continued)

(56) References Cited

U.S. PATENT DOCUMENTS

| 291,032 | A | 1/1884 | Cleland |
| 634,581 | A | 10/1899 | Miller |

(Continued)

FOREIGN PATENT DOCUMENTS

| CA | 2631998 A1 | 11/2008 |
| CH | 365507 A | 11/1962 |

(Continued)

OTHER PUBLICATIONS

U.S. Appl. No. 15/956,949, filed Apr. 19, 2018, Peter Derelöv, (Cited herein as US Patent Application Publication No. 2019/0323535 A1 of Oct. 24, 2019).

(Continued)

*Primary Examiner* — Michael P Ferguson
(74) *Attorney, Agent, or Firm* — Boone IP Law

(57) ABSTRACT

A set including a first panel, a second panel and a mechanical locking device for locking the first panel to the second panel, wherein the first panel includes a first edge surface, the second panel includes a second panel surface, the first edge surface is facing the second panel surface in a locked position of the first and the second panel, the mechanical locking device includes at least one rod-shaped element at the first edge surface, at least one insertion groove at the second panel surface, the rod-shaped element is configured to be inserted into the insertion groove, the rod-shaped element extends at a first angle from the first edge surface, the insertion groove extends into the second panel surface at a second angle from the second panel surface, the mechanical locking device further including at least one locking groove.

20 Claims, 14 Drawing Sheets

(51) Int. Cl.
*F16B 12/20* (2006.01)
*A47B 47/00* (2006.01)
*F16B 12/10* (2006.01)

(52) U.S. Cl.
CPC . *A47B 2230/0037* (2013.01); *F16B 2012/103* (2013.01)

(58) Field of Classification Search
CPC .............. A47B 47/042; A47B 47/0066; A47B 2230/0029; A47B 2230/0037; A47B 2230/07; A47B 2210/09; A47B 2088/902
See application file for complete search history.

(56) References Cited

U.S. PATENT DOCUMENTS

| | | |
|---|---|---|
| 701,000 A | 5/1902 | Ahrens |
| 861,911 A | 7/1907 | Stewart et al. |
| 881,673 A | 3/1908 | Ellison |
| 1,533,099 A | 4/1925 | Carroll |
| 1,534,468 A | 4/1925 | Shea, Jr. |
| 1,800,386 A | 4/1931 | Hoffman |
| 1,800,387 A | 4/1931 | Greist |
| 1,802,245 A | 4/1931 | Foretich |
| 1,954,242 A | 4/1934 | Heppenstall |
| 2,360,451 A | 10/1944 | Stone |
| 2,362,904 A | 11/1944 | Kramer |
| 2,496,184 A | 1/1950 | Paul |
| 2,681,483 A | 6/1954 | Morawetz |
| 3,002,630 A | 10/1961 | Heisser |
| 3,195,968 A | 7/1965 | Freeman |
| 3,284,152 A | 11/1966 | Schorghuber |
| 3,313,054 A | 4/1967 | Madey |
| 3,347,610 A | 10/1967 | Pilliod |
| 3,410,441 A | 11/1968 | Rhyne |
| 3,722,704 A | 3/1973 | Piretti |
| 3,722,971 A | 3/1973 | Zeischegg |
| 3,742,807 A | 7/1973 | Manning |
| 3,765,465 A | 10/1973 | Gulistan |
| 3,784,271 A | 1/1974 | Schreiber |
| 3,884,002 A | 5/1975 | Logie |
| 3,885,845 A | 5/1975 | Krieks |
| 3,981,118 A | 9/1976 | Johnson et al. |
| 4,089,614 A | 5/1978 | Harley |
| 4,099,887 A | 7/1978 | Mackenroth |
| 4,116,510 A | 9/1978 | Franco |
| 4,142,271 A | 3/1979 | Busse |
| 4,211,379 A | 7/1980 | Morgan et al. |
| 4,222,544 A | 9/1980 | Crowder |
| 4,279,397 A | 7/1981 | Larsson |
| 4,299,067 A | 11/1981 | Bertschi |
| 4,308,961 A | 1/1982 | Kunce |
| 4,324,517 A | 4/1982 | Dey |
| 4,403,886 A | 9/1983 | Haeusler |
| 4,405,253 A | 9/1983 | Stockum |
| 4,509,648 A | 4/1985 | Govang et al. |
| 4,593,734 A | 6/1986 | Wallace |
| 4,595,105 A | 6/1986 | Gold |
| 4,597,122 A | 7/1986 | Handler et al. |
| 4,615,448 A | 10/1986 | Johnstonbaugh |
| 4,629,076 A | 12/1986 | Amstutz et al. |
| 4,750,794 A | 6/1988 | Vegh |
| 4,752,150 A | 6/1988 | Salice |
| 4,815,908 A | 3/1989 | Duran et al. |
| 4,817,900 A | 4/1989 | Whittington et al. |
| 4,844,266 A | 7/1989 | Small et al. |
| 4,883,331 A | 11/1989 | Mengel |
| 4,886,326 A | 12/1989 | Kuzyk |
| 4,888,933 A | 12/1989 | Guomundsson et al. |
| 4,891,897 A | 1/1990 | Gieske et al. |
| 4,909,581 A | 3/1990 | Haheeb |
| 4,938,625 A | 7/1990 | Matsui |
| 4,944,416 A | 7/1990 | Petersen et al. |
| 4,961,295 A | 10/1990 | Kosch et al. |
| 5,004,116 A | 4/1991 | Cattarozzi |
| 5,018,323 A | 5/1991 | Clausen |
| 5,109,993 A | 5/1992 | Hutchison |
| 5,114,265 A | 5/1992 | Grisley |
| 5,121,578 A | 6/1992 | Holz |
| 5,125,518 A | 6/1992 | Ward |
| 5,138,803 A | 8/1992 | Grossen |
| 5,209,556 A | 5/1993 | Anderson |
| 5,212,925 A | 5/1993 | McClinton |
| 5,299,509 A | 4/1994 | Ballard |
| 5,360,121 A | 11/1994 | Sothman |
| 5,375,802 A | 12/1994 | Branham, II |
| 5,423,155 A | 6/1995 | Bauer |
| 5,451,102 A | 9/1995 | Chuan |
| 5,458,433 A | 10/1995 | Stastny |
| 5,471,804 A | 12/1995 | Winter, IV |
| 5,475,960 A | 12/1995 | Lindal |
| 5,499,667 A | 3/1996 | Nakanishi |
| 5,499,886 A | 3/1996 | Short et al. |
| 5,507,331 A | 4/1996 | Nakanishi |
| 5,527,103 A | 6/1996 | Pittman |
| 5,658,086 A | 8/1997 | Brokaw et al. |
| 5,711,115 A | 1/1998 | Wirt |
| 5,775,521 A | 7/1998 | Tisbo |
| 5,810,505 A | 9/1998 | Henriott et al. |
| 5,893,617 A | 4/1999 | Lee |
| 5,941,026 A | 8/1999 | Eisenreich et al. |
| 5,944,294 A | 8/1999 | Baer |
| 5,950,389 A | 9/1999 | Porter |
| 6,045,290 A | 4/2000 | Nocievski |
| 6,050,426 A | 4/2000 | Leurdijk |
| 6,142,436 A | 11/2000 | Thurston et al. |
| 6,312,186 B1 | 11/2001 | Roeck et al. |
| 6,349,507 B1 | 2/2002 | Muellerleile |
| 6,363,645 B1 | 4/2002 | Hunter |
| 6,413,007 B1 | 7/2002 | Lambright |
| 6,418,683 B1 | 7/2002 | Martensson et al. |
| 6,491,172 B2 | 12/2002 | Chance et al. |
| 6,505,452 B1 | 1/2003 | Hannig et al. |
| 6,547,086 B1 | 4/2003 | Harvey |
| 6,578,498 B1 | 6/2003 | Draudt et al. |
| 6,675,979 B2 | 1/2004 | Taylor |
| D486,676 S | 2/2004 | Campbell et al. |
| 6,769,219 B2 | 8/2004 | Schwitte et al. |
| 6,772,890 B2 | 8/2004 | Campbell et al. |
| 6,827,028 B1 | 12/2004 | Callaway |
| 6,971,614 B2 | 12/2005 | Fischer et al. |
| 7,127,860 B2 | 10/2006 | Pervan et al. |
| 7,223,045 B2 | 5/2007 | Migli |
| 7,228,977 B2 | 6/2007 | Perkins et al. |
| 7,300,120 B2 | 11/2007 | Shin |
| 7,451,535 B2 | 11/2008 | Wells et al. |
| 7,451,578 B2 | 11/2008 | Hannig |
| 7,584,583 B2 | 9/2009 | Bergelin et al. |
| 7,614,350 B2 | 11/2009 | Tuttle et al. |
| 7,621,092 B2 | 11/2009 | Groeke et al. |
| 7,641,414 B1 | 1/2010 | Joyce |
| 7,717,278 B2 | 5/2010 | Kao |
| 7,721,503 B2 | 5/2010 | Pervan et al. |
| 7,793,450 B2 | 9/2010 | Chasmer et al. |
| 7,818,939 B2 | 10/2010 | Bearinger et al. |
| 7,998,549 B2 | 8/2011 | Susnjara |
| 8,033,074 B2 | 10/2011 | Pervan et al. |
| 8,038,363 B2 | 10/2011 | Hannig et al. |
| 8,042,311 B2 | 10/2011 | Pervan et al. |
| 8,146,754 B2 | 4/2012 | Apgood et al. |
| 8,220,217 B2 | 7/2012 | Muehlebach |
| 8,234,830 B2 | 8/2012 | Pervan et al. |
| 8,365,499 B2 | 2/2013 | Nilsson et al. |
| 8,387,327 B2 | 3/2013 | Pervan |
| 8,464,408 B2 | 6/2013 | Hazzard |
| 8,495,849 B2 | 7/2013 | Pervan |
| 8,505,257 B2 | 8/2013 | Boo et al. |
| 8,544,230 B2 | 10/2013 | Pervan |
| 8,596,013 B2 | 12/2013 | Boo |
| 8,602,227 B1 | 12/2013 | Mcdonald |
| 8,615,952 B2 | 12/2013 | Engstrom |
| 8,713,886 B2 | 5/2014 | Pervan et al. |
| 8,745,952 B2 | 6/2014 | Perra et al. |
| 8,764,137 B2 | 7/2014 | Fehre |

(56) References Cited

U.S. PATENT DOCUMENTS

| | | |
|---|---|---|
| 8,776,473 B2 | 7/2014 | Pervan et al. |
| 8,833,028 B2 | 9/2014 | Whispell et al. |
| 8,864,407 B1 | 10/2014 | Sorum |
| 8,882,416 B2 | 11/2014 | Baur et al. |
| 8,887,468 B2 | 11/2014 | Hakansson et al. |
| 9,175,703 B2 | 11/2015 | Maertens et al. |
| 9,216,541 B2 | 12/2015 | Boo et al. |
| 9,290,948 B2 | 3/2016 | Cappelle et al. |
| 9,375,085 B2 | 6/2016 | Peter |
| 9,538,842 B2 | 1/2017 | Hkansson et al. |
| 9,655,442 B2 | 5/2017 | Boo et al. |
| 9,700,157 B2 | 7/2017 | Keyvanloo |
| 9,714,672 B2 | 7/2017 | Peter |
| 9,723,923 B2 | 8/2017 | Peter |
| 9,726,210 B2 | 8/2017 | Derelv et al. |
| 9,745,756 B2 | 8/2017 | Hannig |
| 9,758,973 B2 | 9/2017 | Segaert et al. |
| 9,763,528 B2 | 9/2017 | Lung et al. |
| 9,771,964 B2 | 9/2017 | Leveen et al. |
| 9,809,983 B2 | 11/2017 | Trudel |
| 9,945,121 B2 | 4/2018 | Peter |
| 10,034,541 B2 | 7/2018 | Boo et al. |
| 10,202,996 B2 | 2/2019 | Hkansson et al. |
| 10,378,570 B2 | 8/2019 | Broughton |
| 10,415,613 B2 | 9/2019 | Boo |
| 10,448,739 B2 | 10/2019 | Derelov et al. |
| 10,451,097 B2 | 10/2019 | Brnnstrm et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelv et al. |
| 10,669,716 B2 | 6/2020 | Peter |
| 10,670,064 B2 | 6/2020 | Peter |
| 10,724,564 B2 | 7/2020 | Peter |
| 10,731,688 B2 | 8/2020 | Brnnstrm et al. |
| 10,736,416 B2 | 8/2020 | Derelv et al. |
| 10,830,266 B2 | 11/2020 | Fridlund |
| 10,830,268 B2 | 11/2020 | Boo |
| 10,871,179 B2 | 12/2020 | Hkansson et al. |
| 10,876,562 B2 | 12/2020 | Pervan |
| 10,876,563 B2 | 12/2020 | Derelv et al. |
| 10,968,936 B2 | 4/2021 | Boo et al. |
| 11,076,691 B2 | 8/2021 | Boo |
| 11,083,287 B2 | 8/2021 | Boo et al. |
| 11,098,484 B2 | 8/2021 | Derelov |
| 11,137,007 B2 | 10/2021 | Fridlund |
| 11,204,051 B2 | 12/2021 | Brnnstrm et al. |
| 11,246,415 B2 | 2/2022 | Derelov et al. |
| 11,272,783 B2 | 3/2022 | Peter |
| 11,326,636 B2 | 5/2022 | Pervan |
| 11,371,542 B2 | 6/2022 | Derelov |
| 11,428,253 B2 | 8/2022 | Hakansson et al. |
| 11,445,819 B2 | 9/2022 | Derelöv et al. |
| 11,445,820 B2 | 9/2022 | Derelöv et al. |
| 11,448,249 B2 | 9/2022 | Derelöv |
| 11,448,252 B2 | 9/2022 | Boo |
| 11,506,235 B2 | 11/2022 | Fransson et al. |
| 11,536,307 B2 | 12/2022 | Peter |
| 12,012,984 B2 * | 6/2024 | Svensson ............... F16B 12/24 |
| 2002/0170258 A1 | 11/2002 | Schwitte et al. |
| 2004/0165946 A1 | 8/2004 | Areh et al. |
| 2005/0042027 A1 | 2/2005 | Migli |
| 2005/0236544 A1 | 10/2005 | Mancino et al. |
| 2005/0247653 A1 | 11/2005 | Brooks |
| 2006/0091093 A1 | 5/2006 | Armari |
| 2006/0101769 A1 | 5/2006 | Pervan et al. |
| 2006/0180561 A1 | 8/2006 | Wisnoski et al. |
| 2006/0236642 A1 | 10/2006 | Pervan |
| 2006/0273085 A1 | 12/2006 | Casto |
| 2007/0006543 A1 | 1/2007 | Engstrom |
| 2007/0028547 A1 | 2/2007 | Grafenauer et al. |
| 2008/0010937 A1 | 1/2008 | Pervan et al. |
| 2008/0066415 A1 | 3/2008 | Pervan et al. |
| 2008/0193209 A1 | 8/2008 | Henderson |
| 2008/0216435 A1 | 9/2008 | Nolan |
| 2008/0236088 A1 | 10/2008 | Hannig |
| 2008/0244882 A1 | 10/2008 | Woxman et al. |
| 2009/0014401 A1 | 1/2009 | Tallman |
| 2009/0019806 A1 | 1/2009 | Muehlebach |
| 2009/0064624 A1 | 3/2009 | Sokol |
| 2010/0028592 A1 | 2/2010 | Barkdoll et al. |
| 2010/0083603 A1 | 4/2010 | Goodwin |
| 2010/0104354 A1 | 4/2010 | Spalding |
| 2010/0173122 A1 | 7/2010 | Susnjara |
| 2010/0289389 A1 | 11/2010 | Crabtree, II |
| 2011/0023303 A1 | 2/2011 | Pervan et al. |
| 2011/0121560 A1 | 5/2011 | Readman |
| 2011/0225921 A1 | 9/2011 | Schulte |
| 2011/0225922 A1 | 9/2011 | Pervan et al. |
| 2011/0280655 A1 | 11/2011 | Maertens et al. |
| 2011/0283650 A1 | 11/2011 | Pervan et al. |
| 2012/0009383 A1 | 1/2012 | Hardesty |
| 2012/0027967 A1 | 2/2012 | Maertens et al. |
| 2012/0073235 A1 | 3/2012 | Hannig |
| 2012/0124932 A1 | 5/2012 | Schulte et al. |
| 2012/0145845 A1 | 6/2012 | Hightower |
| 2012/0180416 A1 | 7/2012 | Perra et al. |
| 2012/0279161 A1 | 11/2012 | Hakansson et al. |
| 2012/0286637 A1 | 11/2012 | Fehre |
| 2013/0014463 A1 | 1/2013 | Pervan |
| 2013/0048632 A1 | 2/2013 | Chen |
| 2013/0071172 A1 | 3/2013 | Maertens et al. |
| 2013/0081349 A1 | 4/2013 | Pervan et al. |
| 2013/0097846 A1 | 4/2013 | Pettigrew et al. |
| 2013/0111845 A1 | 5/2013 | Pervan et al. |
| 2013/0170904 A1 | 7/2013 | Cappelle et al. |
| 2013/0232905 A2 | 9/2013 | Pervan |
| 2013/0287484 A1 | 10/2013 | Phillips |
| 2014/0013919 A1 | 1/2014 | Gerke et al. |
| 2014/0055018 A1 | 2/2014 | Shein et al. |
| 2014/0111076 A1 | 4/2014 | Devos et al. |
| 2014/0286701 A1 | 9/2014 | Sauer |
| 2014/0294498 A1 | 10/2014 | Logan |
| 2015/0034522 A1 | 2/2015 | Itou et al. |
| 2015/0035422 A1 | 2/2015 | Hakansson et al. |
| 2015/0078807 A1 | 3/2015 | Brnnstrm et al. |
| 2015/0078819 A1 | 3/2015 | Derelv et al. |
| 2015/0196118 A1 | 7/2015 | Peter |
| 2015/0198191 A1 | 7/2015 | Boo |
| 2015/0230600 A1 | 8/2015 | Schulte |
| 2015/0368896 A1 | 12/2015 | Schulte |
| 2016/0000220 A1 | 1/2016 | Devos et al. |
| 2016/0007751 A1 | 1/2016 | Peter |
| 2016/0145029 A1 | 5/2016 | Ranade et al. |
| 2016/0174704 A1 | 6/2016 | Boo et al. |
| 2016/0186925 A1 | 6/2016 | Bettin |
| 2016/0192775 A1 | 7/2016 | Andersson |
| 2016/0270531 A1 | 9/2016 | Peter |
| 2017/0079433 A1 | 3/2017 | Derelov et al. |
| 2017/0089379 A1 | 3/2017 | Pervan |
| 2017/0097033 A1 | 4/2017 | Hakansson et al. |
| 2017/0159291 A1 | 6/2017 | Peter |
| 2017/0208938 A1 | 7/2017 | Derelv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Peter |
| 2017/0328072 A1 | 11/2017 | Hannig |
| 2017/0360193 A1 | 12/2017 | Boo et al. |
| 2018/0080488 A1 | 3/2018 | Peter |
| 2018/0087552 A1 | 3/2018 | Derelv et al. |
| 2018/0112695 A1 | 4/2018 | Boo et al. |
| 2018/0119717 A1 | 5/2018 | Peter |
| 2018/0202160 A1 | 7/2018 | Peter |
| 2018/0283430 A1 | 10/2018 | Leistert |
| 2018/0328396 A1 | 11/2018 | Fransson et al. |
| 2019/0113061 A1 | 4/2019 | Hakansson et al. |
| 2019/0166989 A1 | 6/2019 | Boo et al. |
| 2019/0191870 A1 | 6/2019 | Peter |
| 2019/0195256 A1 | 6/2019 | Peter |
| 2019/0289999 A1 | 9/2019 | Derelv et al. |
| 2019/0320793 A1 | 10/2019 | Boo |
| 2019/0323532 A1 | 10/2019 | Boo |

(56) References Cited

U.S. PATENT DOCUMENTS

| | | |
|---|---|---|
| 2019/0323533 A1 | 10/2019 | Boo |
| 2019/0323534 A1 | 10/2019 | Peter |
| 2019/0323535 A1 | 10/2019 | Peter |
| 2020/0003242 A1 | 1/2020 | Brnnstrm et al. |
| 2020/0055126 A1 | 2/2020 | Fridlund |
| 2020/0069049 A1 | 3/2020 | Derelv et al. |
| 2020/0102978 A1 | 4/2020 | Fridlund |
| 2020/0121076 A1 | 4/2020 | Derelov et al. |
| 2020/0214447 A1 | 7/2020 | Derelv et al. |
| 2020/0300284 A1 | 9/2020 | Pervan |
| 2020/0337455 A1 | 10/2020 | Boo et al. |
| 2020/0340513 A1 | 10/2020 | Peter |
| 2021/0047840 A1 | 2/2021 | Pervan |
| 2021/0079650 A1 | 3/2021 | Derelov |
| 2021/0148392 A1 | 5/2021 | Brnnstrm et al. |
| 2021/0180630 A1 | 6/2021 | Bruno et al. |
| 2021/0190112 A1 | 6/2021 | Peter |
| 2021/0207635 A1 | 7/2021 | Hkansson et al. |
| 2021/0222716 A1 | 7/2021 | Derelv et al. |
| 2021/0262507 A1 | 8/2021 | Svensson et al. |
| 2021/0262508 A1 | 8/2021 | Svensson et al. |
| 2021/0276108 A1 | 9/2021 | Derelv et al. |
| 2021/0285480 A1 | 9/2021 | Derelv et al. |
| 2022/0018373 A1 | 1/2022 | Boo |
| 2022/0049735 A1 | 2/2022 | Meijer |
| 2022/0242058 A1 | 8/2022 | Derelöv et al. |
| 2022/0243751 A1 | 8/2022 | Brännström et al. |
| 2022/0275821 A1 | 9/2022 | Svensson et al. |
| 2022/0299057 A1 | 9/2022 | Pervan |
| 2022/0354248 A1 | 11/2022 | Derelöv et al. |

FOREIGN PATENT DOCUMENTS

| | | |
|---|---|---|
| CH | 685276 A5 | 5/1995 |
| CH | 696889 A5 | 1/2008 |
| CH | 698988 B1 | 12/2009 |
| CH | 705082 A2 | 12/2012 |
| CN | 101099618 A | 1/2008 |
| CN | 102917616 A | 2/2013 |
| CN | 203424576 U | 2/2014 |
| DE | 1107910 B | 5/1961 |
| DE | 2414104 A1 | 10/1975 |
| DE | 2514357 A1 | 10/1975 |
| DE | 3103281 A1 | 8/1982 |
| DE | 228872 A1 | 10/1985 |
| DE | 4229115 A1 | 3/1993 |
| DE | 9417168 U1 | 2/1995 |
| DE | 19831936 A1 | 2/1999 |
| DE | 29820031 U1 | 2/1999 |
| DE | 19805538 A1 | 8/1999 |
| DE | 20304761 U1 | 4/2004 |
| DE | 29924630 U1 | 5/2004 |
| DE | 202005019986 U1 | 2/2006 |
| DE | 202004017486 U1 | 4/2006 |
| DE | 202009008825 U1 | 10/2009 |
| DE | 102008035293 A1 | 2/2010 |
| DE | 102009041142 A1 | 3/2011 |
| DE | 102011057018 A1 | 6/2013 |
| DE | 102013008595 A1 | 11/2013 |
| DE | 102015103429 A1 | 10/2015 |
| DE | 102014110124 A1 | 1/2016 |
| DE | 202017101856 U1 | 4/2017 |
| EP | 0060203 A2 | 9/1982 |
| EP | 0357129 A1 | 3/1990 |
| EP | 0362968 A1 | 4/1990 |
| EP | 0675332 A2 | 10/1995 |
| EP | 0871156 A2 | 10/1998 |
| EP | 1048423 A2 | 11/2000 |
| EP | 1650375 A1 | 4/2006 |
| EP | 1671562 A1 | 6/2006 |
| EP | 1863984 A1 | 12/2007 |
| EP | 1922954 A1 | 5/2008 |
| EP | 2017403 A2 | 1/2009 |
| EP | 2333353 A2 | 6/2011 |
| EP | 2487373 A1 | 8/2012 |
| EP | 3031998 A1 | 6/2016 |
| FR | 2517187 A1 | 6/1983 |
| FR | 2597173 A1 | 10/1987 |
| FR | 2602013 A1 | 1/1988 |
| FR | 3044723 B1 | 12/2017 |
| GB | 0245332 A | 1/1926 |
| GB | 1022377 A | 3/1966 |
| GB | 2163825 A | 3/1986 |
| GB | 2315988 A | 2/1998 |
| GB | 2445954 A | 7/2008 |
| GB | 2482213 A | 1/2012 |
| GB | 2520927 A | 6/2015 |
| JP | 48-018461 U | 3/1973 |
| JP | 48-050330 U | 7/1973 |
| JP | 50-138972 A | 11/1975 |
| JP | 51-086927 U | 7/1976 |
| JP | 53-113160 U | 9/1978 |
| JP | 06-022606 U | 3/1994 |
| JP | 2003-239921 A | 8/2003 |
| KR | 10-1147274 B1 | 5/2012 |
| KR | 10-2014-0042314 A | 4/2014 |
| NO | 99/22150 A1 | 5/1999 |
| WO | 87/07339 A1 | 12/1987 |
| WO | 90/07066 A2 | 6/1990 |
| WO | 99/41508 A2 | 8/1999 |
| WO | 00/66856 A1 | 11/2000 |
| WO | 01/53628 A1 | 7/2001 |
| WO | 02/55809 A1 | 7/2002 |
| WO | 02/55810 A1 | 7/2002 |
| WO | 03/83234 A1 | 10/2003 |
| WO | 2004/079130 A1 | 9/2004 |
| WO | 2005/068747 A1 | 7/2005 |
| WO | 2006/043893 A1 | 4/2006 |
| WO | 2006/104436 A1 | 10/2006 |
| WO | 2007/015669 A2 | 2/2007 |
| WO | 2008/004960 A2 | 1/2008 |
| WO | 2008/017281 A1 | 2/2008 |
| WO | 2008/150234 A1 | 12/2008 |
| WO | 2009/136195 A1 | 11/2009 |
| WO | 2010/087752 A1 | 8/2010 |
| WO | 2011/151758 A2 | 12/2011 |
| WO | 2012/095454 A1 | 7/2012 |
| WO | 2012/154113 A1 | 11/2012 |
| WO | 2013/009257 A1 | 1/2013 |
| WO | 2013/025163 A1 | 2/2013 |
| WO | 2013/080160 A1 | 6/2013 |
| WO | 2013/118075 A1 | 8/2013 |
| WO | 2014/072080 A1 | 5/2014 |
| WO | 2014/121410 A1 | 8/2014 |
| WO | 2015/015603 A1 | 2/2015 |
| WO | 2015/038059 A1 | 3/2015 |
| WO | 2015/105449 A1 | 7/2015 |
| WO | 2015/105450 A1 | 7/2015 |
| WO | 2015/105451 A1 | 7/2015 |
| WO | 2015/155430 A1 | 10/2015 |
| WO | 2016/099396 A1 | 6/2016 |
| WO | 2016/175701 A1 | 11/2016 |
| WO | 2016/187533 A1 | 11/2016 |
| WO | 2017/131574 A1 | 8/2017 |
| WO | 2017/138874 A1 | 8/2017 |
| WO | 2018/004435 A1 | 1/2018 |
| WO | 2018/080387 A1 | 5/2018 |
| WO | 2019/125291 A1 | 6/2019 |
| WO | 2019/125292 A1 | 6/2019 |

OTHER PUBLICATIONS

U.S. Appl. No. 16/386,810, filed Apr. 17, 2019, Christian Boo, (Cited herein as US Patent Application Publication No. 2019/0323533 A1 of Oct. 24, 2019).

U.S. Appl. No. 16/553,350, filed Aug. 28, 2019, Peter Derelöv and Johan Svensson, (Cited herein as US Patent Application Publication No. 2020/0069049 A1 of Mar. 5, 2020).

U.S. Appl. No. 16/663,603, filed Oct. 25, 2019, Magnus Fridlund, (Cited herein as US Patent Application Publication No. 2020/0055126 A1 of Feb. 20, 2020).

(56) References Cited

OTHER PUBLICATIONS

U.S. Appl. No. 16/856,765, filed Apr. 29, 2020, Peter Derelöv, (Cited herein as US Patent Application Publication No. 2020/0340513 A1 of Oct. 29, 2020).

U.S. Appl. No. 16/953,608, filed Nov. 20, 2020, Peter Derelöv, Hans Brännström and Agne PÅlsson, (Cited herein as US Patent Application Publication No. 2021/0285480 A1 of Sep. 16, 2021).

U.S. Appl. No. 17/154,344, filed Jan. 21, 2021, Peter Derelöv and Johan Svensson, (Cited herein as US Patent Application Publication No. 2021/00222716 A1 of Jul. 22, 2021).

U.S. Appl. No. 17/173,823, filed Feb. 11, 2021, Peter Derelöv and Johan Svensson, (Cited herein as US Patent Application Publication No. 2021/0276108 A1 of Sep. 9, 2021).

U.S. Appl. No. 17/185,428, filed Feb. 25, 2021, Johan Svensson and Peter Derelöv, (Cited herein as US Patent Application Publication No. 2021/0262508 A1 of Aug. 26, 2021).

U.S. Appl. No. 17/185,403, filed Feb. 25, 2021, Johan Svensson and Peter Derelöv, (Cited herein as US Patent Application Publication No. 2021/0262507 A1 of Aug. 26, 2021).

U.S. Appl. No. 17/370,521, filed Jul. 8, 2021, Christian Boo, (Cited herein as US Patent Application Publication No. 2022/0018373 A1 of Jan. 20, 2022).

U.S. Appl. No. 17/524,923, filed Nov. 11, 2021, Hans Brännström, Agne PÅlsson and Peter Derelöv, (Cited herein as US Patent Application Publication No. 2022/0243751 A1 of Aug. 4, 2022).

U.S. Appl. No. 17/588,733, filed Jan. 31, 2022, Peter Derelöv and Johan Svensson, (Cited herein as US Patent Application Publication No. 2022/0242058 A1 of Aug. 4, 2022).

U.S. Appl. No. 17/674,262, filed Feb. 17, 2022, Johan Svensson and Peter Derelöv, (Cited herein as US Patent Application Publication No. 2022/0275821 A1 of Sep. 1, 2022).

U.S. Appl. No. 17/717,359, filed Apr. 11, 2022, Darko Pervan, (Cited herein as US Patent Application Publication No. 2022/0299057 A1 of Sep. 22, 2022).

U.S. Appl. No. 17/869,911, filed Jul. 21, 2022, Niclas HÅkansson and Darko Pervan.

U.S. Appl. No. 17/870,215, filed Jul. 21, 2022, Peter Derelöv and Christian Boo, (Cited herein as US Patent Application Publication No. 2022/0354248 A1 of Nov. 10, 2022).

U.S. Appl. No. 17/883,203, filed Aug. 8, 2022, Christian Boo.

U.S. Appl. No. 18/058,037, filed Nov. 22, 2022, Peter Derelöv.

Extended European Search Report mailed Apr. 8, 2022 in EP 19854740.8, European Patent Office, Munich, DE, 9 pages.

International Search Report and Written Opinion mailed Oct. 17, 2019 in PCT/SE2019/050801, ISA/SE, Patent-och registreringsverket, Stockholm, SE, 14 Pages.

* cited by examiner

SET OF PANELS WITH A MECHANICAL LOCKING DEVICE

CROSS REFERENCE TO RELATED APPLICATIONS

The present application is a continuation of U.S. application Ser. No. 16/553,325, filed on Aug. 28, 2019, which claims the benefit of Swedish Application No. 1851028-9, filed on Aug. 30, 2018. The entire contents of each of U.S. application Ser. No. 16/553,325 and Swedish Application No. 1851028-9 are hereby incorporated herein by reference in their entirety.

TECHNICAL FIELD

Embodiments of the present invention relate to panels that may be arranged perpendicular to each other and locked together with a mechanical locking device. The panels may be assembled and locked together to obtain a furniture product, such as a bookshelf, a cupboard, a wardrobe, a box, a drawer or a furniture component.

TECHNICAL BACKGROUND

A furniture product provided with a mechanical locking device is known in the art, as evidenced by WO2015/038059. The furniture product comprises a first panel connected perpendicular to a second panel by a mechanical locking device comprising a flexible tongue in an insertion groove.

The above description of various known aspects is the applicant's characterization of such, and is not an admission that any of the above description is considered as prior art.

Embodiments of the present invention address a need to provide panels that may be easily assembled.

SUMMARY

It is an object of certain aspects of the present invention to provide an improvement over the above described techniques and known art; particularly to facilitate assembling of panels configured to be assembled without the need of using any tools.

A further object of at least certain aspects of the present invention is to facilitate assembling of panels configured to be assembled with a locking device that is easy to manufacture and to use, which reduces the risk of incorrect installation thereof.

A further object of at least certain aspects of the present invention is to facilitate assembling of panels configured to be assembled in a more stable and aesthetic way.

At least some of these and other objects and advantages that will be apparent from the description have been achieved by a set comprising a first panel, a second panel and a mechanical locking device for locking the first panel to the second panel, wherein the first panel comprises a first edge surface and a first panel surface, the second panel comprises a second panel surface, the first edge surface is facing and/or is parallel with the second panel surface in a locked position of the first and the second panel, the mechanical locking device comprises at least one rod-shaped element at the first edge surface and at least one insertion groove at the second panel surface, the rod-shaped element is configured to be inserted into the insertion groove, the rod-shaped element extends at a first angle from the first edge surface, the insertion groove extends into the second panel surface at an angle from the second panel surface, the mechanical locking device further comprises at least one locking groove at the first edge surface or at the second panel surface and at least one locking part, wherein the locking groove comprises at least one locking surface extending at a third angle from the first edge surface or from the second panel surface, the locking part is configured to be inserted into the locking groove and lock against the locking surface, and the third angle is different than the first angle.

According to an aspect the mechanical locking device is configured to obtain the locked position by displacing first panel relative the second panel in an assembly direction which is essentially parallel with the first panel surface.

According to an aspect the third angle is about 45° to about 90° larger than the first angle.

According to an aspect the locking part is positioned at the first edge surface or at the second panel surface and the locking groove is positioned at the opposite second panel surface or first edge surface.

According to an aspect the first angle is within the range of about 30° to about 60, or within the range of about 40° to about 50, or about 45°.

According to an aspect the assembly direction is essentially parallel with at least one of the first angle and the second angle.

According to an aspect the locking part is flexible.

According to an aspect the locking part, in an unflexed/non-compressed state, is configured to be positioned partly in the locking groove.

According to an aspect the locking part comprises a spring.

According to an aspect the locking part is arranged in a locking part groove on the first edge surface or on the second panel surface.

According to an aspect the locking part, in a flexed/compressed state, is configured to be substantially positioned in the locking part groove.

According to an aspect the insertion groove and/or the locking groove is a drill hole.

According to an aspect the drill hole is a bottom-ended drill hole.

According to an aspect the rod-shaped element is arranged in a rod element groove in the first edge surface.

According to an aspect the set comprises a first panel groove on the first panel surface on the first panel and a second panel groove on the second panel surface of the second panel.

According to an aspect a width of the first panel groove is essentially the same as a width of the second panel groove.

According to an aspect the set further comprises a back panel configured to be inserted in, and optionally to cooperate with, the first and second panel groove.

According to an aspect the first panel comprises a second edge surface, the second panel comprises a third edge surface, the first panel groove is substantially parallel to the second edge surface and the second panel groove is substantially parallel to the third edge surface.

According to an aspect the first panel groove extends substantially along the entire second edge surface and the second panel groove extends essentially along the entire third edge surface.

According to an aspect the first panel groove and/or the second panel groove is bottom-ended.

According to an aspect an extension of the back panel from the first edge of the first panel, when one first panel, one second panel, and one back panel have been assembled, is less than an extension of the rod shaped element from the first edge surface.

According to an aspect the core of the first panel and/or of the second panel may be a wood-based core, such as MDF, HDF, OSB, WPC, plywood or particleboard. The core may also be a plastic core comprising thermosetting plastic or thermoplastic, e.g., vinyl, PVC, PU or PET. The plastic core may comprise fillers.

The first panel and/or the second panel may also be of solid wood.

The first panel and/or the second panel may be provided with a decorative layer, such as a foil or a veneer, on one or more surfaces.

At least some of the above identified and other objects and advantages that may be apparent from the description have been achieved by a locking device for a furniture product in accordance with the above.

BRIEF DESCRIPTION OF THE DRAWINGS

These and other aspects, features and advantages of which embodiments of the invention are capable of, will be apparent and elucidated from the following description of embodiments and aspects of the present invention, reference being made to the accompanying drawings, in which.

DETAILED DESCRIPTION

Figure 1:
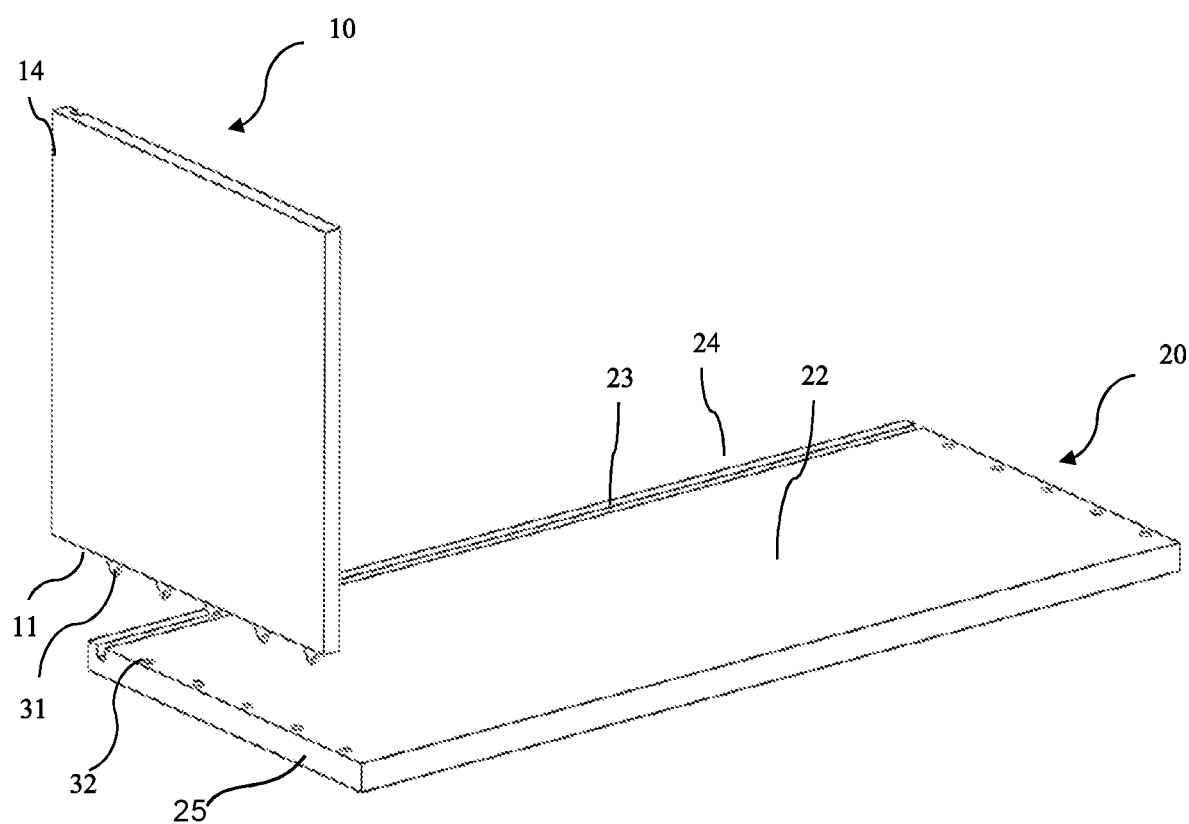
FIG. 1 shows a 3D view from above of a set in an unassembled state of an aspect of the invention.
Figure 2:
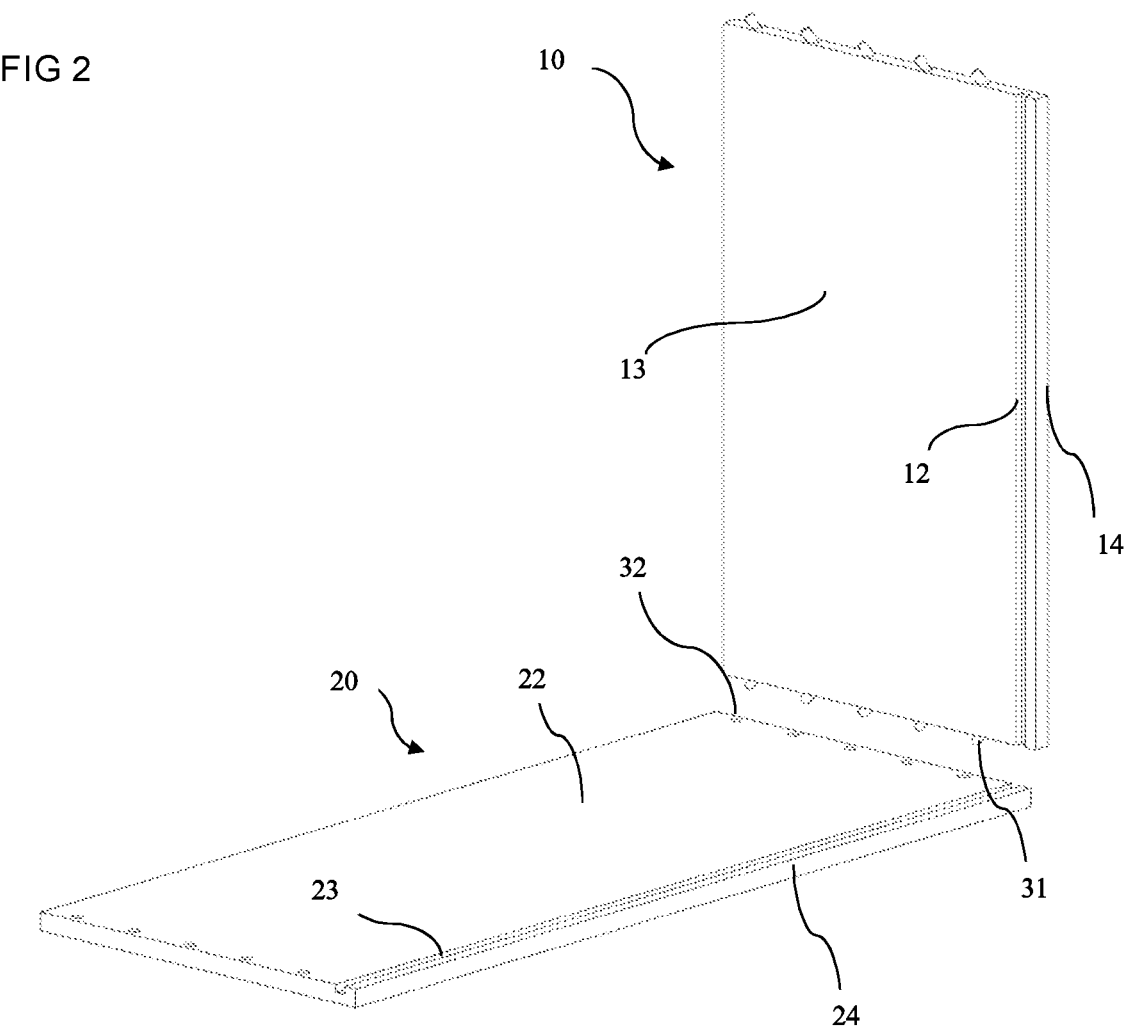
FIG. 2 shows a 3D view from above of a set in an unassembled state of an aspect of the invention.
Figure 3:
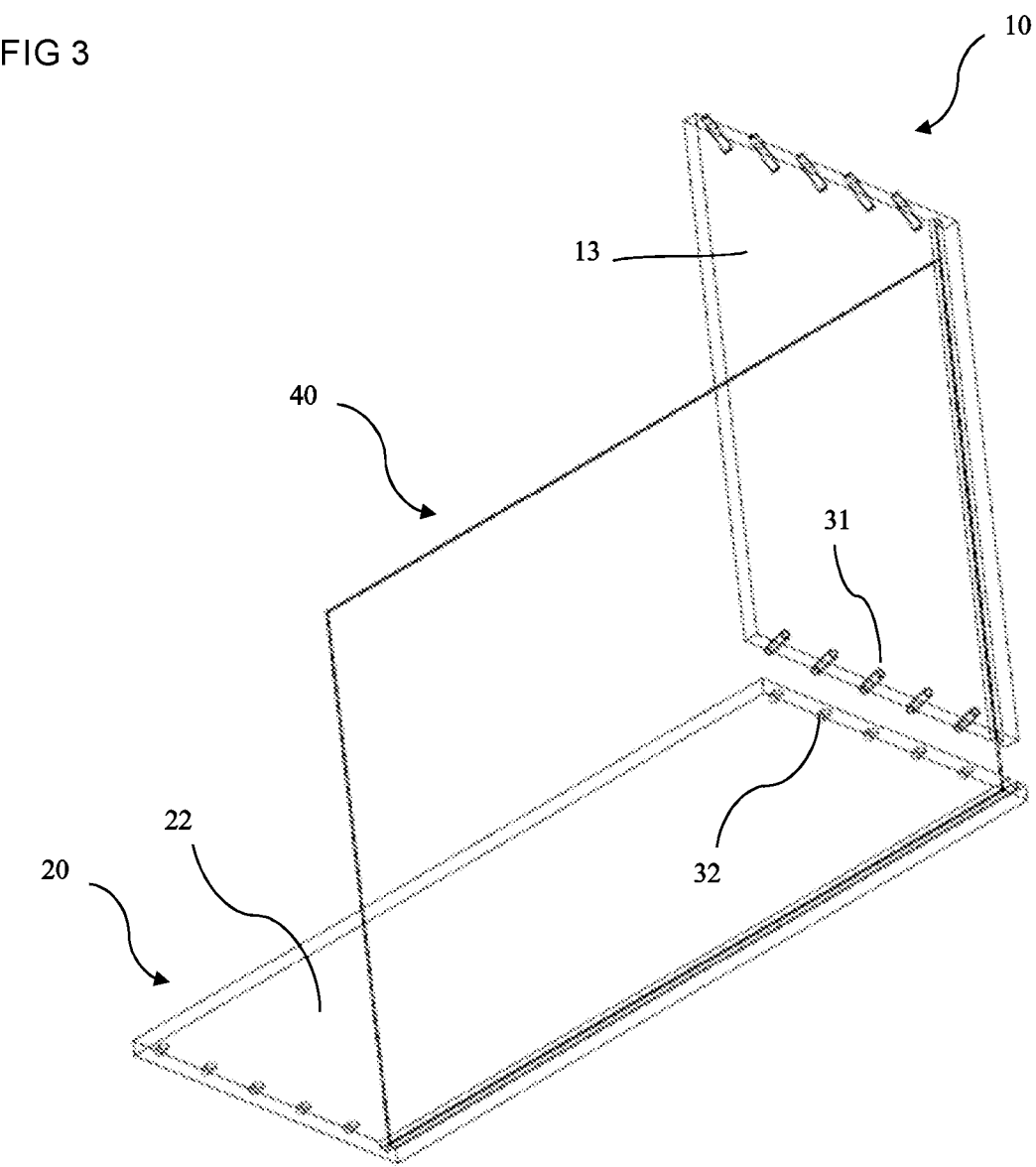
FIG. 3 shows a 3D view from above of a set in an unassembled state of an aspect of the invention.
Figure 4:
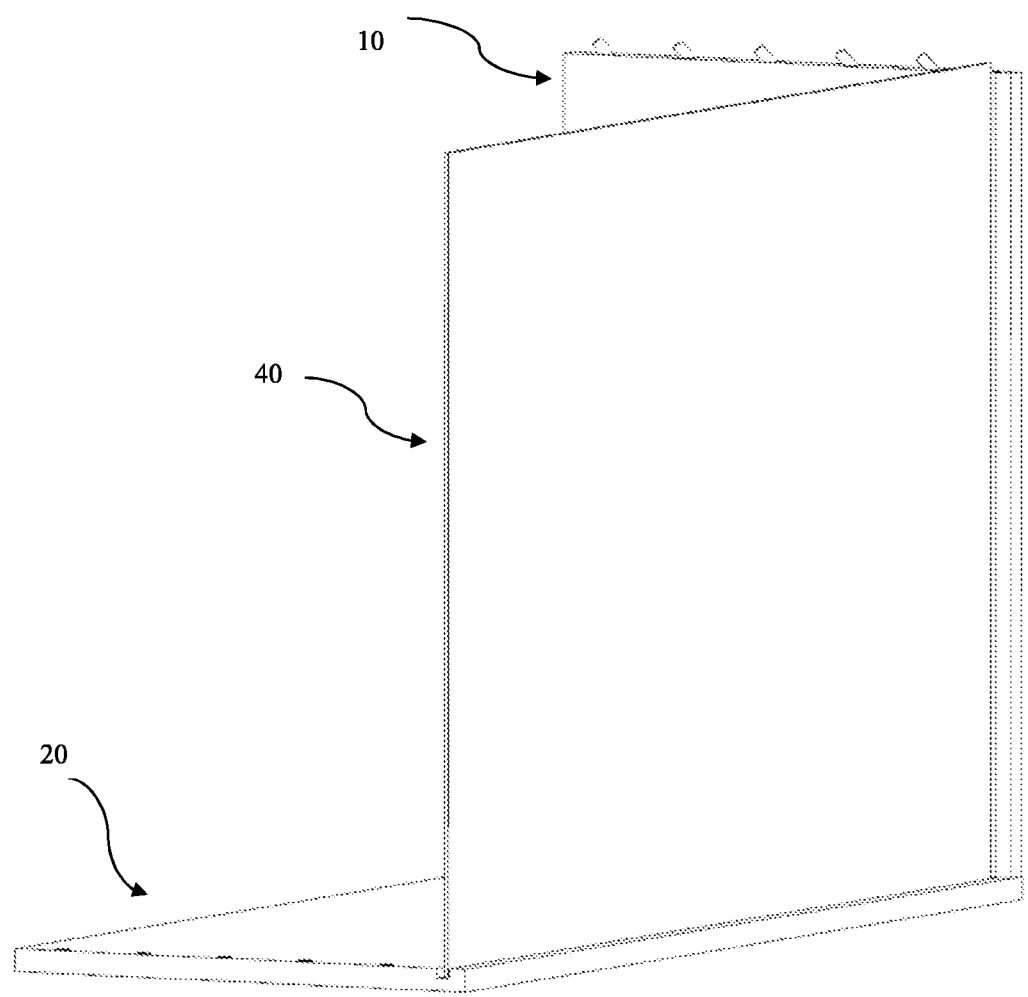
FIG. 4 shows a 3D side view of a set in an assembled state of an aspect of the invention.

Specific embodiments of the invention will now be described with reference to the accompanying drawings.

This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

In the drawings and specification, there have been disclosed exemplary aspects of the disclosure. However, many variations and modifications may be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation, for example, definition of dimensions such as width or breadth or height or length or diameter depends on how exemplary aspects are depicted, hence, if depicted differently, a shown width or diameter in one depiction is a length or thickness in another depiction.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

The different aspects, alternatives and embodiments of the invention disclosed herein may be combined with one or more of the other aspects, alternatives and embodiments described herein. Two or more aspects may be combined.

Embodiments of the invention are shown in FIGS. 1-16 including a set comprising a first panel 10, a second panel 20 and a mechanical locking device for locking of the first panel 10 to the second panel 20. The first panel 10 comprises a first edge surface 11 and a first panel surface 13. The second panel 20 comprises a second panel surface 22. The first edge surface 11 is facing or parallel to the second panel surface 22 in a locked position of the first and the second panel 10, 20. The mechanical locking device comprises at least one element 31 at the first edge surface 11 and at least one insertion groove 32 at the second panel surface 22. The element 31 may be rod-shaped. The rod-shaped element 31 is configured to be inserted into the insertion groove 32. The rod-shaped element 31 extends at a first angle α1 from the first edge surface 11 and the insertion groove 32 extends into the second panel surface 22 at a second angle α2 from the second panel surface 22. When there are more than one element 31, each element 31 may be arranged parallel to each other element 31. When there are more than one insertion grooves 32, each insertion groove 32 may be arranged parallel to each other insertion groove 32. The mechanical locking device further comprises at least one locking groove 35 at the first edge surface 11 or at the second panel surface 22 and at least one locking part 34. The locking groove 35 comprises at least one locking surface 37 extending at a third angle β from the first edge surface 11 or from the second panel surface 22. The locking part 34 is configured to be inserted into the locking groove 35 and lock against the locking surface 37, and the third angle β is different than the first angle α1.

The first panel 10 and the second panel 20 may be panels for a furniture product and may be a part of a frame of a furniture product.

The set may be configured for locking the first panel 10 to the second panel 20 with the first panel surface 13 perpendicular or essentially perpendicular to the second panel surface 22.

The second panel 20 may comprise a fourth edge surface 25 and the insertion groove 32 may be positioned adjacent the fourth edge surface 25. The set may be configured for locking the first panel 10 to the second panel 20 with the first panel surface 13 parallel or essentially parallel to the fourth edge surface 25.

FIGS. 1-3, 5A, 7-8, 11, and 16 disclose a set according to an aspect in an unassembled state. FIGS. 4, 6, 9-10, and 12-14 disclose a set according to an aspect in an assembled state. The set may be assembled by a displacement of the first panel 10 relative the second panel 20 in an assembly direction 111, 112, 114 which is essentially parallel with the first panel surface 13. The mechanical locking device may be configured to automatically lock the first panel 10 to the second panel 20 when the rod-shaped element 31 is inserted into the insertion groove 32 and the locking part 34 is inserted into the locking groove 35 and locks against the locking surface 37. The set may be locked when the first edge surface 11 is arranged against the second panel surface 22.

The third angle β may be about 45° to about 90° larger than the first angle α1 and/or the second angle α2.

The locking part 34 may be positioned at the first edge surface 11 or at the second panel surface 22 and the locking groove 35 may be positioned at the opposite second panel surface 22 or the first edge surface 11.

The first angle α1 and/or the second angle α2 may be within the range of about 30° to 60°, or within the range of about 40° to 50°, or about 45°. The first angle α1 and the second angle α2 may be parallel or essentially parallel.

The assembly direction 111, 112, 114 may be essentially parallel with the first angle α1 and/or the second angle α2.

The third angle β of the locking surface 37 may be within the range of about 70° to 110°, or within the range of about 80° to 100°, or within the range of about 85° to 95°, or about 90°.

The locking part 34 may be flexible.

The locking part 34, in an unflexed/non-compressed state, may be configured to be positioned partly in the locking groove 35.

The locking part 34 may comprise a spring.

The locking part 34 may be arranged in a locking part groove 38 on the first edge surface 11 or on the second panel surface 22.

The locking part 34, in a flexed/compressed state, may be configured to be substantially positioned in the locking part groove 38.

When the first 10 and second 20 panels are assembled together the locking part 34 may be compressed and is substantially positioned in the locking part groove 38. The locking part 34 may comprise a spring that facilitates the compression of the locking part 34. When the first panel 10 is displaced in relation to the second panel 20 in the assembly direction, the rod-shaped element 31 becomes inserted into the insertion groove 32. When the locking part 34 meets the locking groove 35 the locking part 34 may expand out from the locking part groove 38 and protrude into the locking groove 35. The first panel 10 and second panel 20 will then be locked together, since the positioning of a part of the locking part 34 in the locking groove 35 hinders the first panel 10 from being displaced in relation to the second panel 20 in a direction opposite to the assembly direction.

The insertion groove 32 and/or the locking groove 35 may be a drill hole. The drill hole may be a bottom-ended drill hole.

The insertion groove 32 may have a diameter D2.

Figure 8:
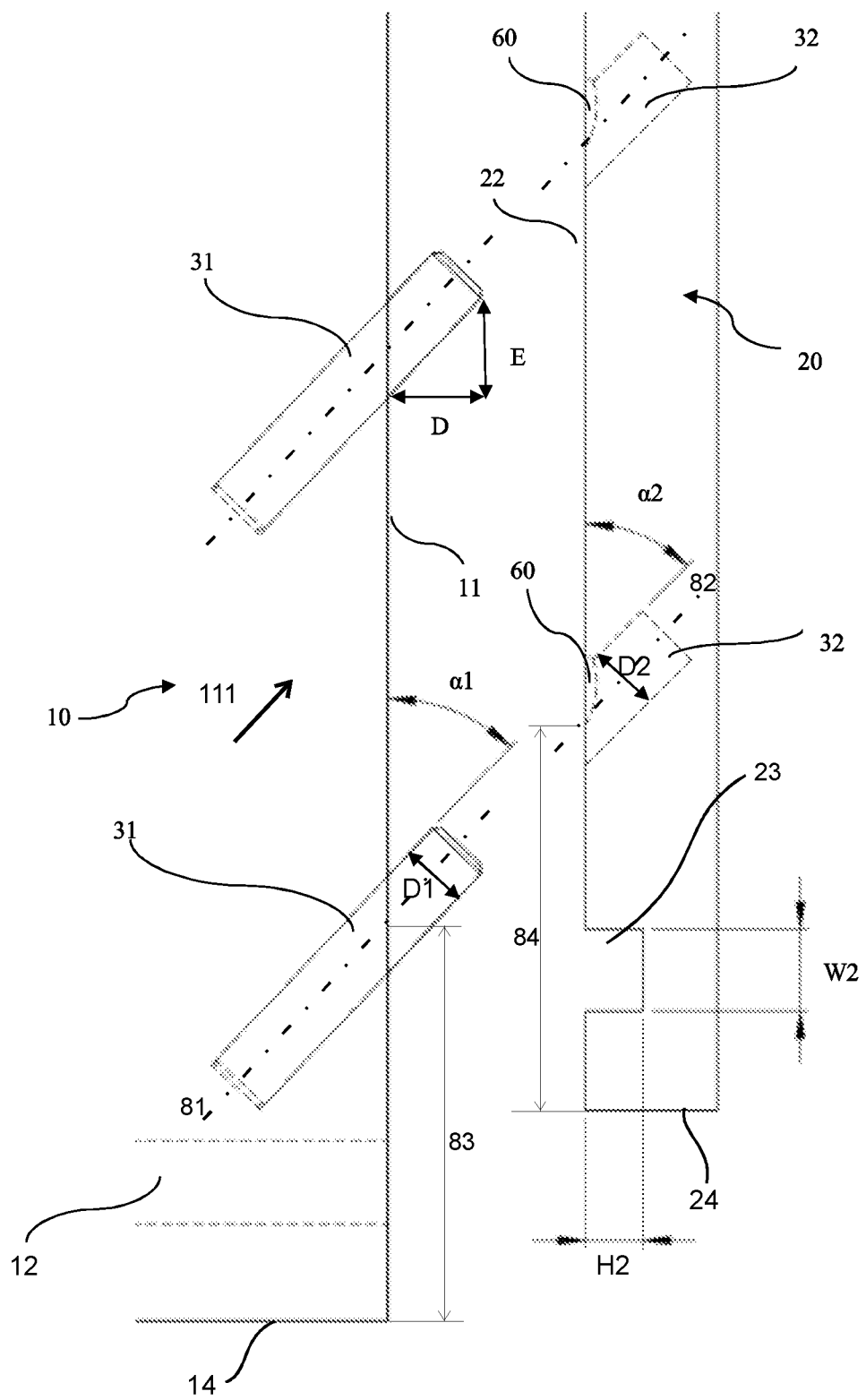
FIG. 8 shows an enlargement of part of the view shown in FIG. 7.
Figure 9:
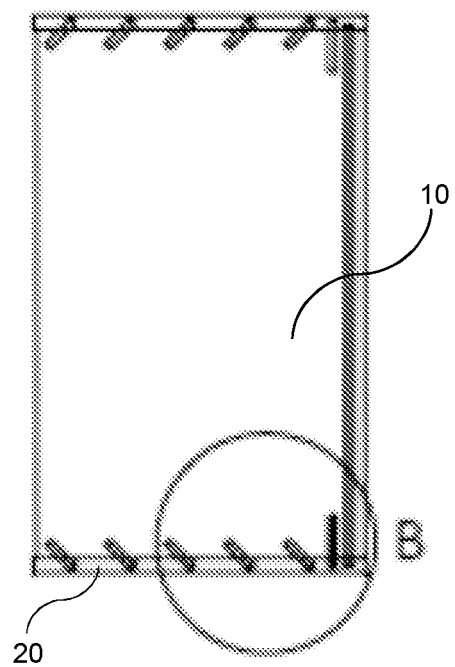
FIG. 9 shows a side view of a set in an assembled state of an aspect of the invention.
Figure 10:
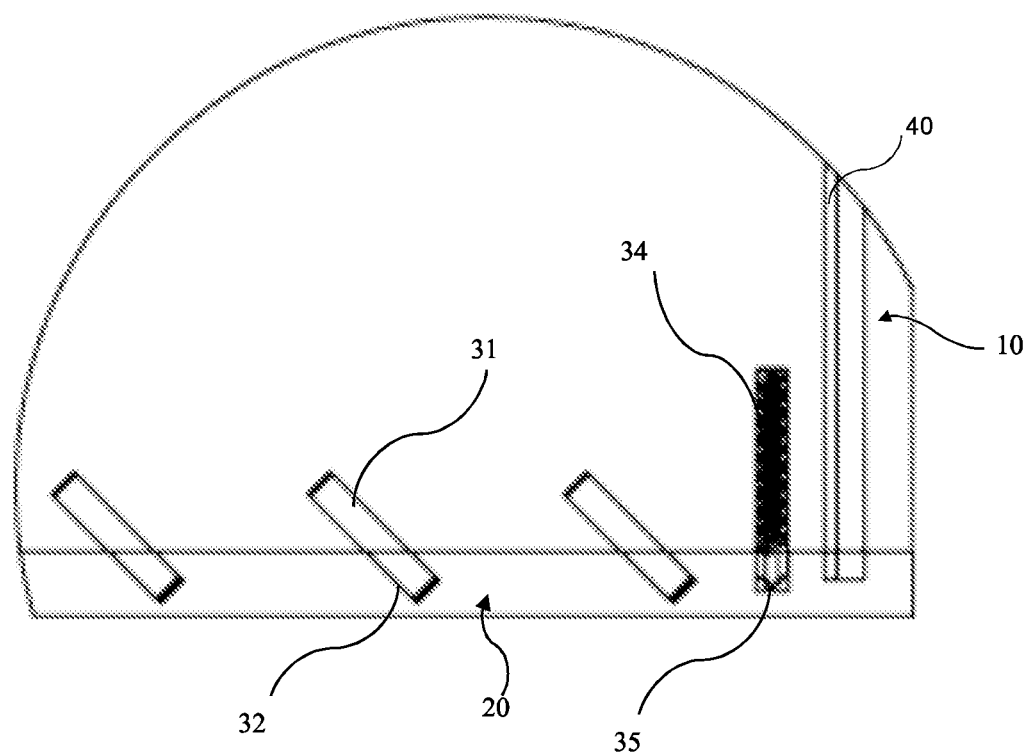
FIG. 10 shows an enlargement of part of the set shown in FIG. 9.

The insertion groove 32 may comprise a chamfer 60 or a rounding, which is configured to guide the rod shaped element during assembling, as shown in FIG. 8.

The rod-shaped element 31 may be arranged in a rod element groove 36 on the first edge surface 11 on the first panel 10 or on the second panel surface 22 on the second panel 20.

The rod-shaped element 31 may have a diameter D1. The diameter D2 of the insertion groove 32 may be larger than the diameter D1 of the rod-shaped element 31. The diameter D2 of the insertion groove 32 may be about 0.3 to about 0.8 mm larger than the diameter D1 of the rod-shaped element 31 for optimal assembly.

According to an aspect the set may comprise a first panel groove 12 on the first panel surface 13 on the first panel 10 and/or a second panel groove 23 on the second panel surface 22 of the second panel 20.

The first panel groove 12 on the first panel surface 13 may comprise a width W1.

The second panel groove 23 on the second panel surface 22 may comprise a width W2.

The width W1 of the first panel groove 12 may be essentially the same as the width W2 of the second panel groove 23.

The set may further comprise a back panel 40. The back panel 40 may be configured to be inserted in, and optionally cooperate with, the first panel groove 12 and the second panel groove 23.

Figure 6:
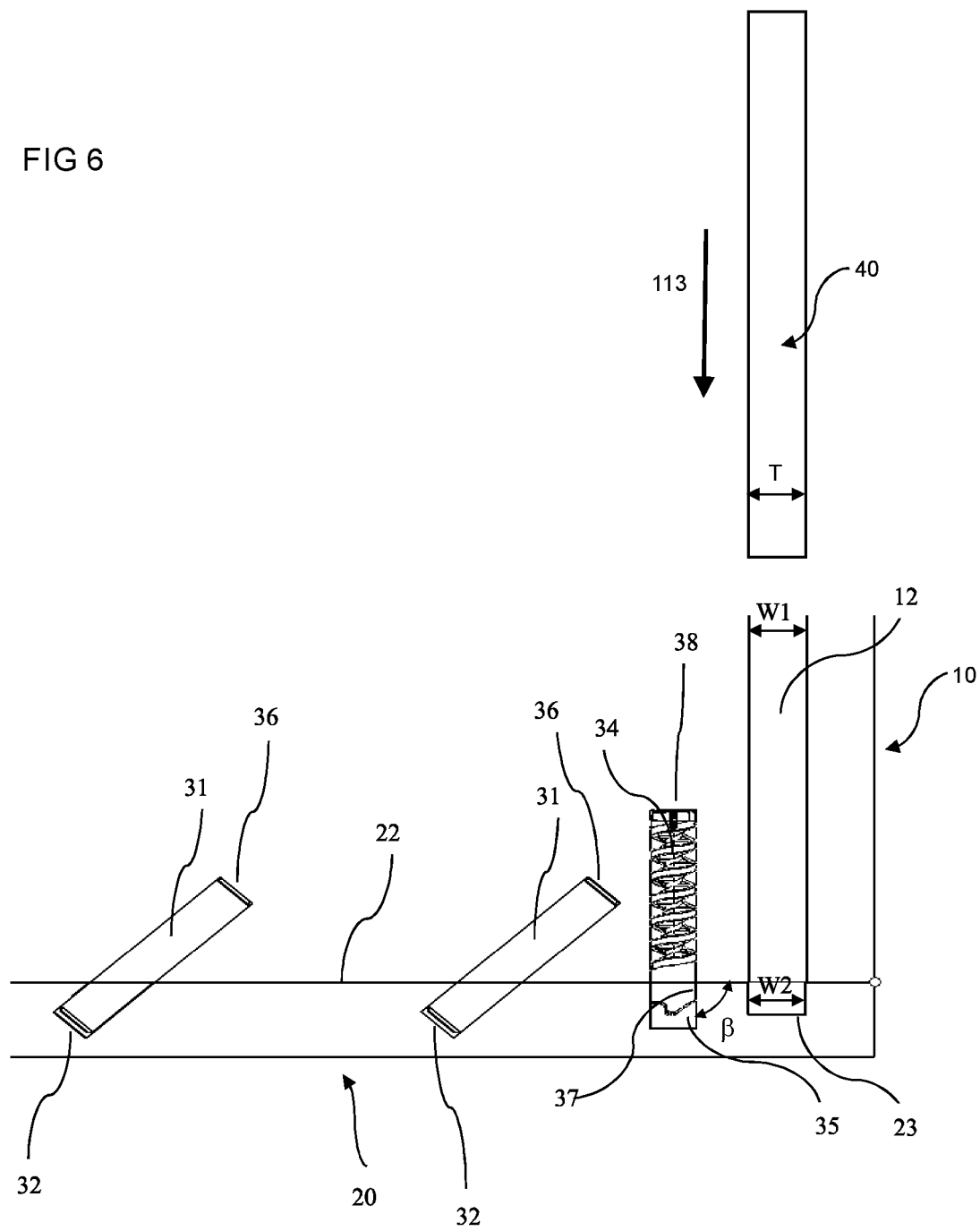
FIG. 6 shows a side view of a set in an assembled state of an aspect of the invention.

FIG. 6 shows that the back panel 40 may be assembled to the first 10 and second 20 panel by displacing the back panel 40 relative the first 10 and second 20 panel in an assembly direction 113 which is essentially perpendicular to the second panel surface 22 of the second panel 20. A thickness T of the back panel 40 may be essentially the same as the width W1, W2 of the first 12 and/or second 23 panel groove.

There may be a play between the back panel 40 and the first 12 and/or second 23 panel groove which may facilitate a displacement of an edge of the back panel 40 in the first 12 and/or second 23 panel grooves. The play may be in the range of about 0 mm to about 0.5 mm, or about 0.1 mm to about 0.2 mm.

In one aspect the width W1, W2 of the first 12 and/or second 23 panel groove minus a thickness T of the back panel 40, i.e., ΔW, is equal to or larger than an extension H of the back panel 40 in relation to the first panel 10 or second panel 20 after a first panel 10, a second panel 20 and a back panel 40 have been assembled, i.e., ΔW≥H, see FIGS. 12-15.

Figure 13:
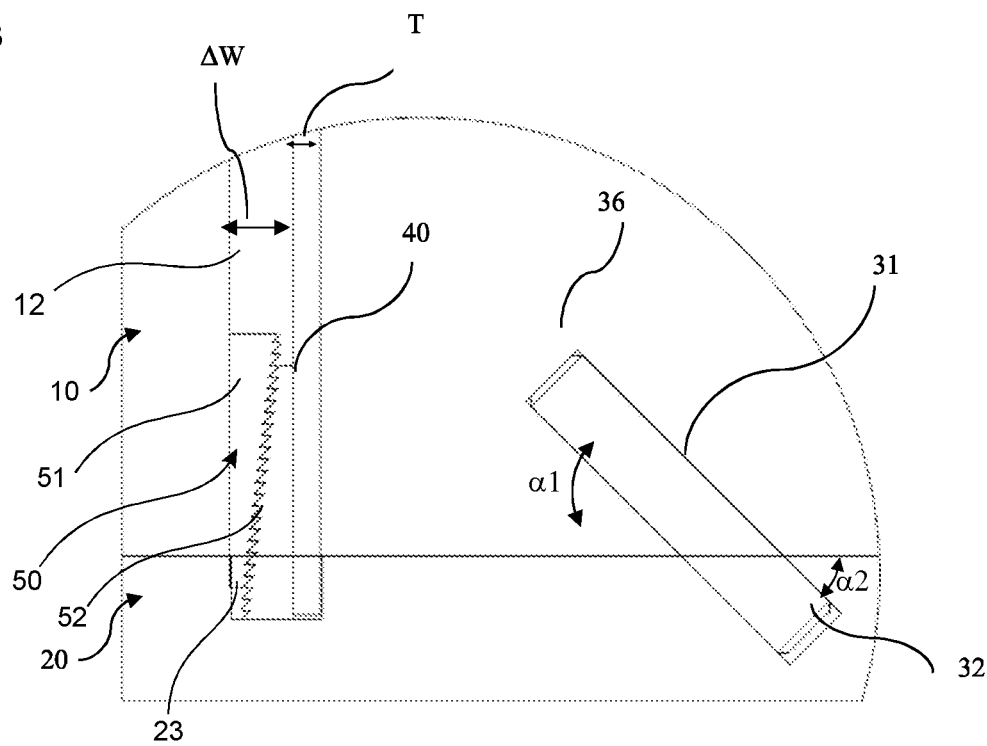
FIG. 13 shows an enlargement of part of the set shown in FIG. 12.
Figure 14:
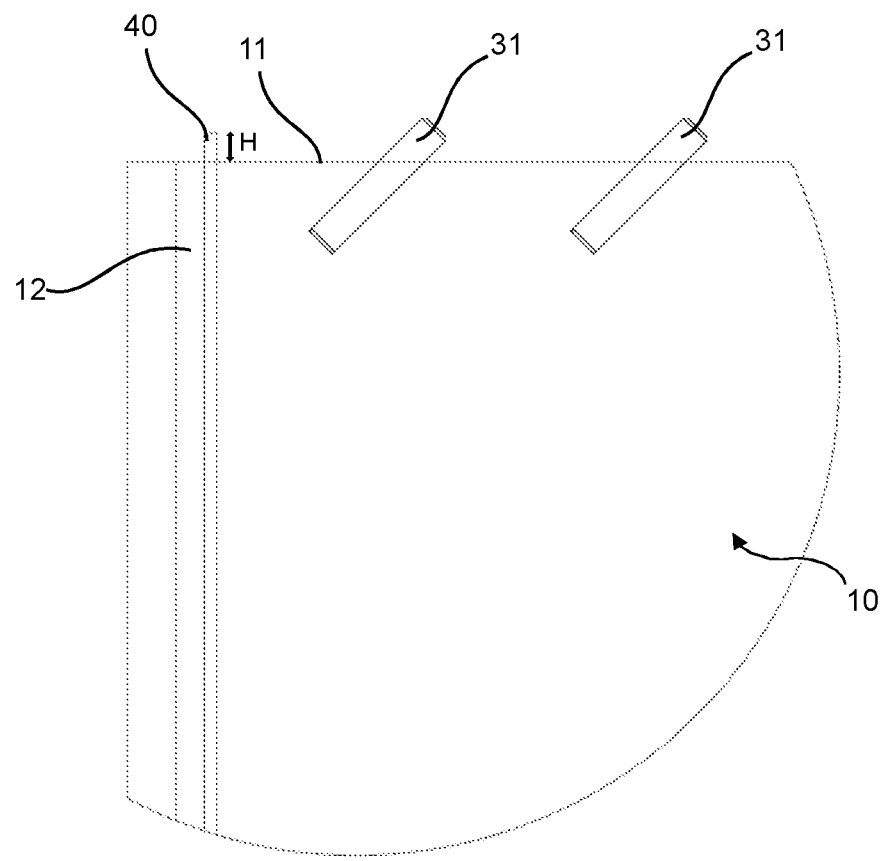
FIG. 14 shows an enlargement of part of the set shown in FIG. 12.

FIG. 13 shows an embodiment comprising a positioning element 50, for positioning the back panel 40 relative the first 12 and/or second 23 panel groove. The positioning element 50 may comprise a first wedge element 51 and second wedge element 52.

In one aspect H is less than an extension D of the rod shaped element 31 from the first edge surface 11.

The rod shaped element 31 may have an extension E along the first edge surface 11.

In one aspect, if a set comprising two of the first panel 10 and two of the second panel 20 are to be assembled, at least one panel 10, 20 may have a width W1, W2 of the first 12 and/or second 23 panel groove that allows for a displacement of the extension H of the back panel 40 within the first 12 and/or second 23 panel groove. The displacement may be equal to or larger than ΔW. In one aspect, all panels 10, 20 have the same width W1, W2 of the first 12 and second 23 panel groove to facilitate the production of the panels.

A length of the back panel 40 may designed to avoid the extension H of the back panel 40.

An edge of the back panel 40 may be essentially flush with the first edge 11 surface of the first panel 10

Figure 15:
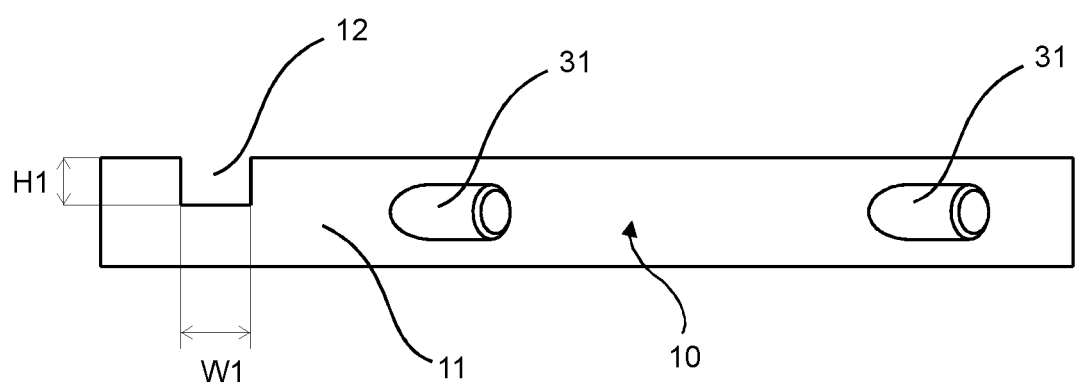
FIG. 15 shows a side view of an embodiment of first panel.

FIG. 15 shows a side view of an embodiment of first panel 10 with the first 12 panel groove. The first 12 panel groove may comprise a width W1 and a height H1. The first panel 10 may comprise a second edge surface 14 and the second panel 20 may comprise a third edge surface 24. The first panel groove 12 may be substantially parallel to the second edge surface 14 and the second panel groove 23 may be substantially parallel to the third edge surface 24.

The first panel groove 12 may extend substantially along the entire second edge surface 14 and the second panel groove 23 may extend essentially along the entire third edge surface 24.

The first panel groove 12 and/or the second panel groove 23 may be bottom-ended.

The first 12 and/or second 23 panel groove may be formed by mechanical cutting, such as milling or sawing.

The first panel groove 12 may be formed in the first panel surface 13 and in a core of the first panel 10. The second panel groove 23 may be formed in the second panel surface 22 and in a core of the second panel 20.

The first edge surface 11 may comprise two or more of said rod-shaped element 31 and the second panel surface 22 may comprise two or more of said insertion groove 32, and vice versa, which may be arranged linearly, wherein each of the rod-shaped elements 31 is configured to be inserted into one insertion groove 32.

A locking of the first panel 10 to the second panel 20 in a direction which is parallel with the second panel surface 22 may be obtained by the locking part 34 being inserted into the locking groove 35 and locking against the locking surface 37. The locking surface extends at the third angle β from the first edge surface 11, where third angle β is about 45° to about 90° larger than the first angle α1.

A cross cut of the insertion groove 32, in a plane parallel to the second panel surface 22, may have a shape that matches a cross cut of the rod-shaped element 31, in a plane parallel to the first edge surface 11. An advantage of this may be that an improved locking of the first panel 10 to the second panel 20 is obtained and that the assembly of the set of panels is done easily.

The rod-shaped element 31 and the insertion groove 32 are disclosed more in detail in FIGS. 5A-8 and 10, which show cross cuts along the rod-shaped element 31 and the insertion groove 32.

Figure 5A:
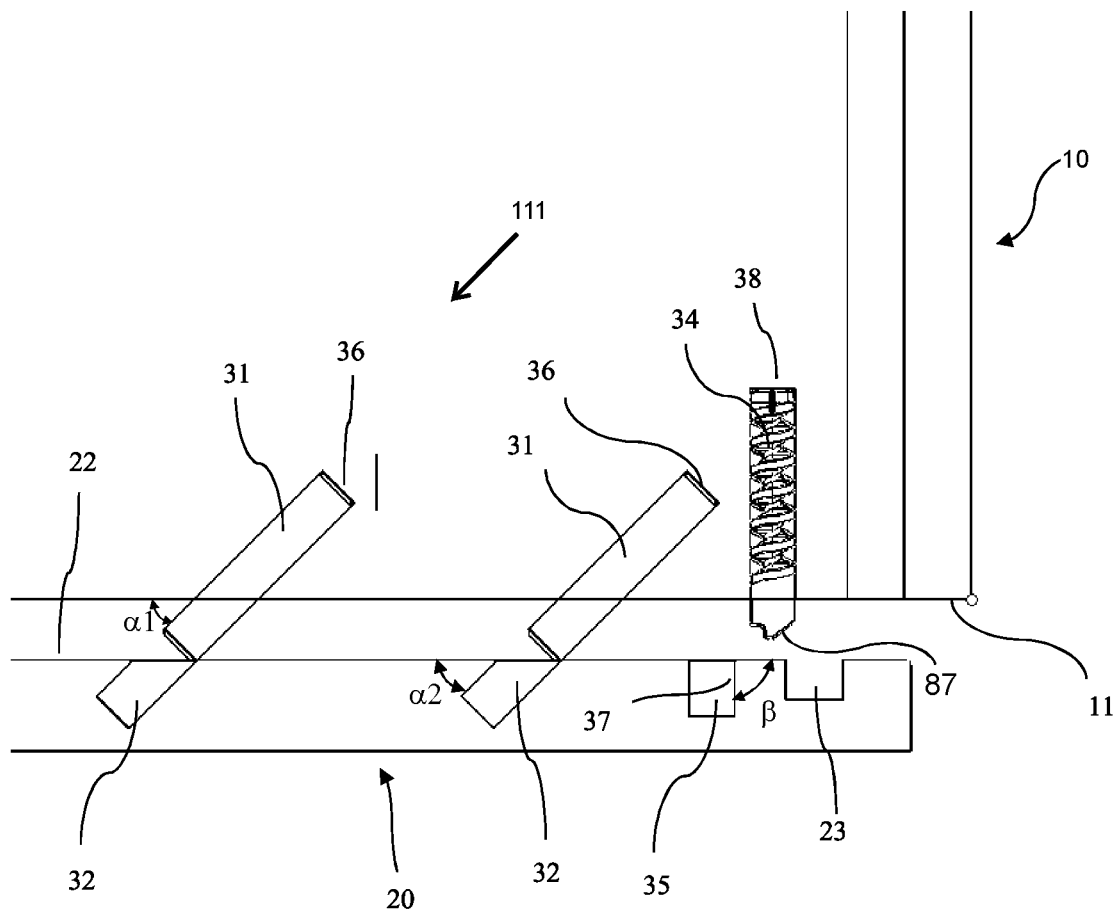
FIG. 5A shows a side view of a set in an unassembled state of an aspect of the invention.

FIG. 5A shows an embodiment of the locking part 34 comprising a guiding surface 87 at outer edge of the locking part 34. The guiding surface is configured to cooperate with an outer edge the locking groove 35 during the insertion of locking part 34 into the locking groove 35.

Figure 5B:
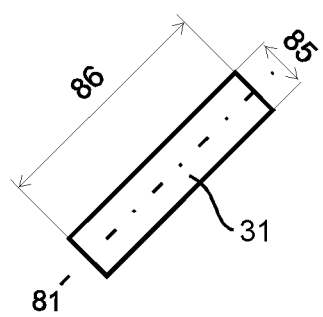
FIG. 5B shows a side view of an embodiment of the rod-shaped element

FIG. 5B shows an embodiment of the rod-shaped element 31 which may be of an elongated shape and comprise a length direction 86, a width direction 85 and a centre line 81 extending in the length direction. According to an aspect the rod-shaped element 31 is configured to be inserted in the rod element groove 36 on the first edge surface 11.

According to an aspect the rod-shaped element 31 is configured to be inserted in the rod element groove 36 on the second panel surface 22.

According to an aspect the rod-shaped element 31 may be configured to be attached in the rod element groove 36 by friction.

According to an aspect the rod-shaped element 31 may be configured to be glued in the rod element groove 36.

According to an aspect the rod-shaped element 31, the rod element groove 36 and the insertion groove 32 may have a substantially circular shape, although other shapes, such as triangular, rectangular, square, etc. are possible.

According to one aspect the locking groove 35 and the locking part 34 may have a substantially circular shape, although other shapes, such as triangular, rectangular, square, etc. are possible.

Figure 7:
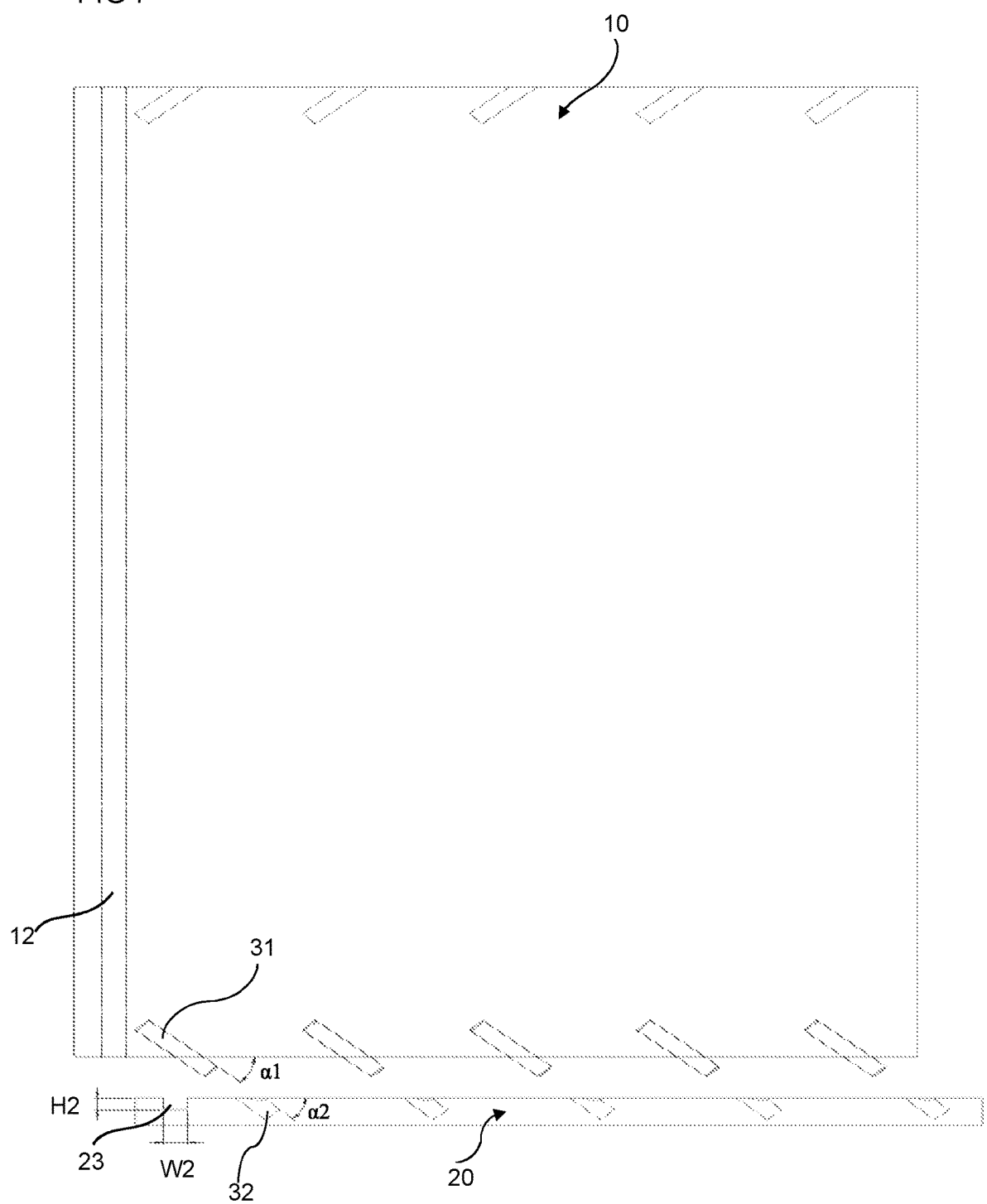
FIG. 7 shows a side view of a set in an unassembled state of an aspect of the invention.

According to an aspect, which is shown in FIG. 7, a first edge surface 11 may have at least one element 31, while the opposite edge surface may have at least one insertion groove 32.

According to a further aspect, a first edge surface 11 may have a combination of at least one element 31 and at least one insertion groove 32. A corresponding second panel surface 22 may have a corresponding combination of at least one insertion groove 32 and at least one element 31.

According to an aspect, which is shown in FIG. 8, the position of at least one rod shaped element 31 may be positioned at first distance 83 from the second edge surface 14. The first distance may be measured from the second edge surface 14 to a centre line 81 of the rod shaped element 31. The corresponding insertion groove 32 may be positioned at a second distance 84 from the third edge surface 24. The second distance may be measured from the third edge surface 24 to a centre line 82 of the insertion groove 32. The first distance may be different from the second distance which may increase the locking force.

The difference between the first distance and the second distance may be in the range of about 0.1 mm to about 0.5 mm.

According to an aspect the rod-shaped element 31 is made from one or more of a wood based material, a polymer material, which may comprise reinforcement, such as glass fibre or a metal.

According to an aspect the rod shaped element 31 may have a waxed surface to facilitate assembly.

According to an aspect the rod-shaped element 31 may be configured to cooperate, in a locked position, with the bottom surface of the insertion groove 32.

The sidewalls of the insertion groove 32 and the locking groove 35 may comprise material of the core of the first panel 10 or the second panel 20, dependent on in which panel they are made. According to an aspect they may also be enforced with, e.g., metal or glass fibre.

According to an aspect the locking groove 35 may be impregnated/reinforced with a liquid.

Figure 11:
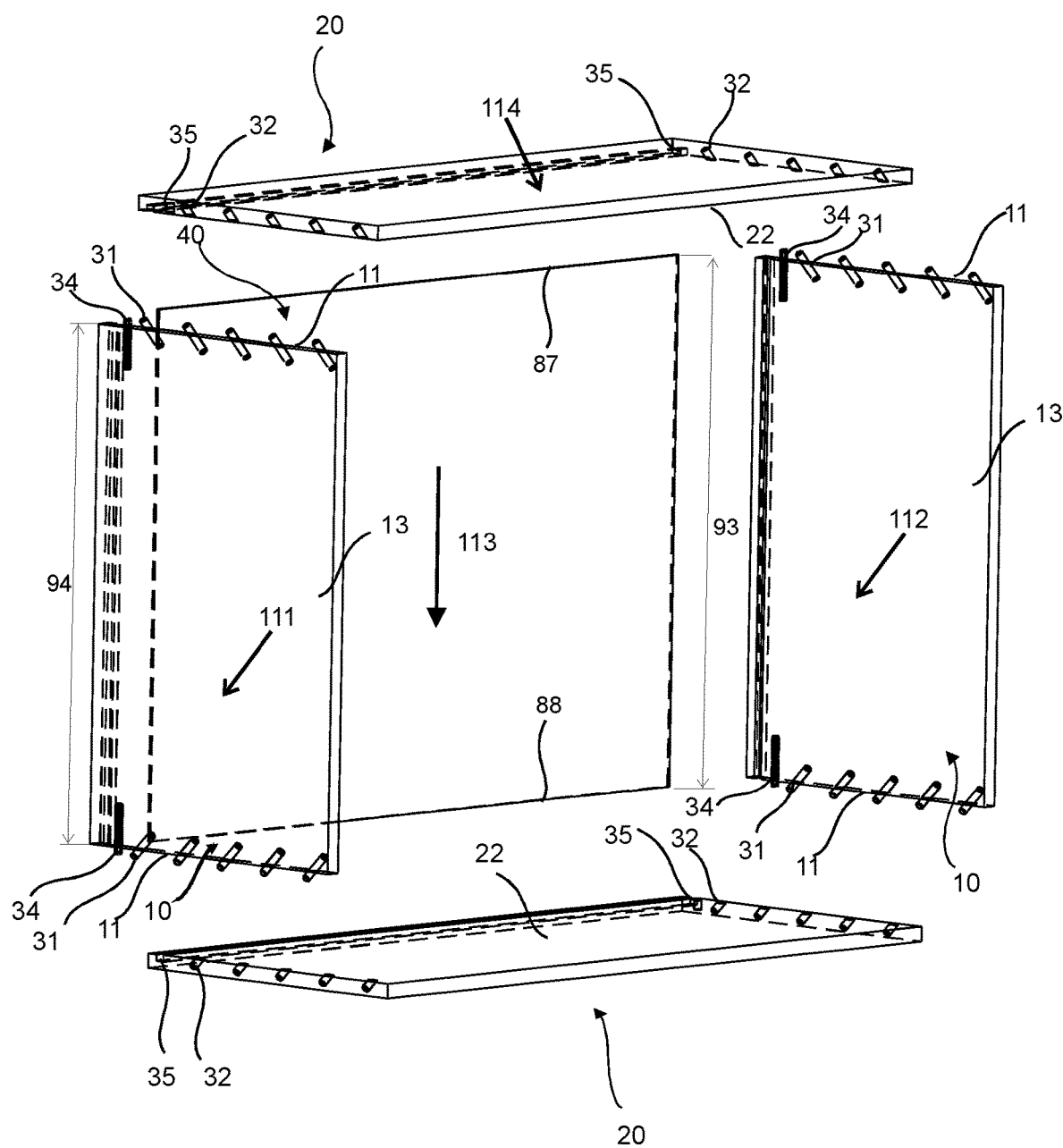
FIG. 11 shows a view of a set comprising two of the first panel, two of the second panel and one back panel in an unassembled state of an aspect of the invention.
Figure 12:
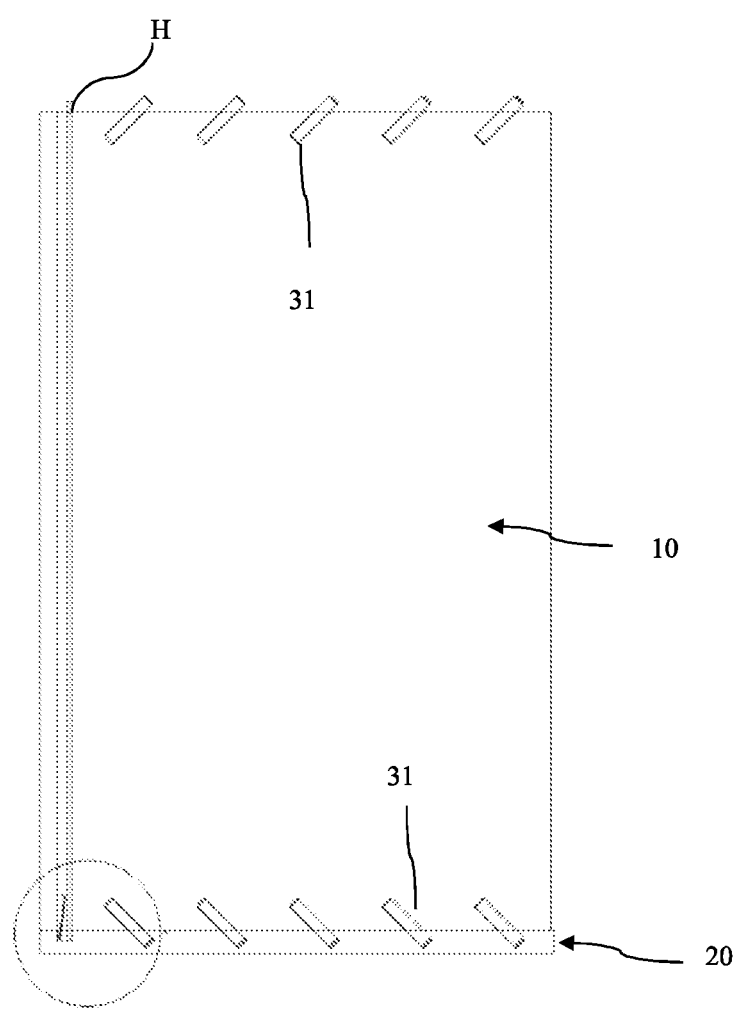
FIG. 12 shows a side view of a set in an assembled state of an aspect of the invention.
Figure 16:
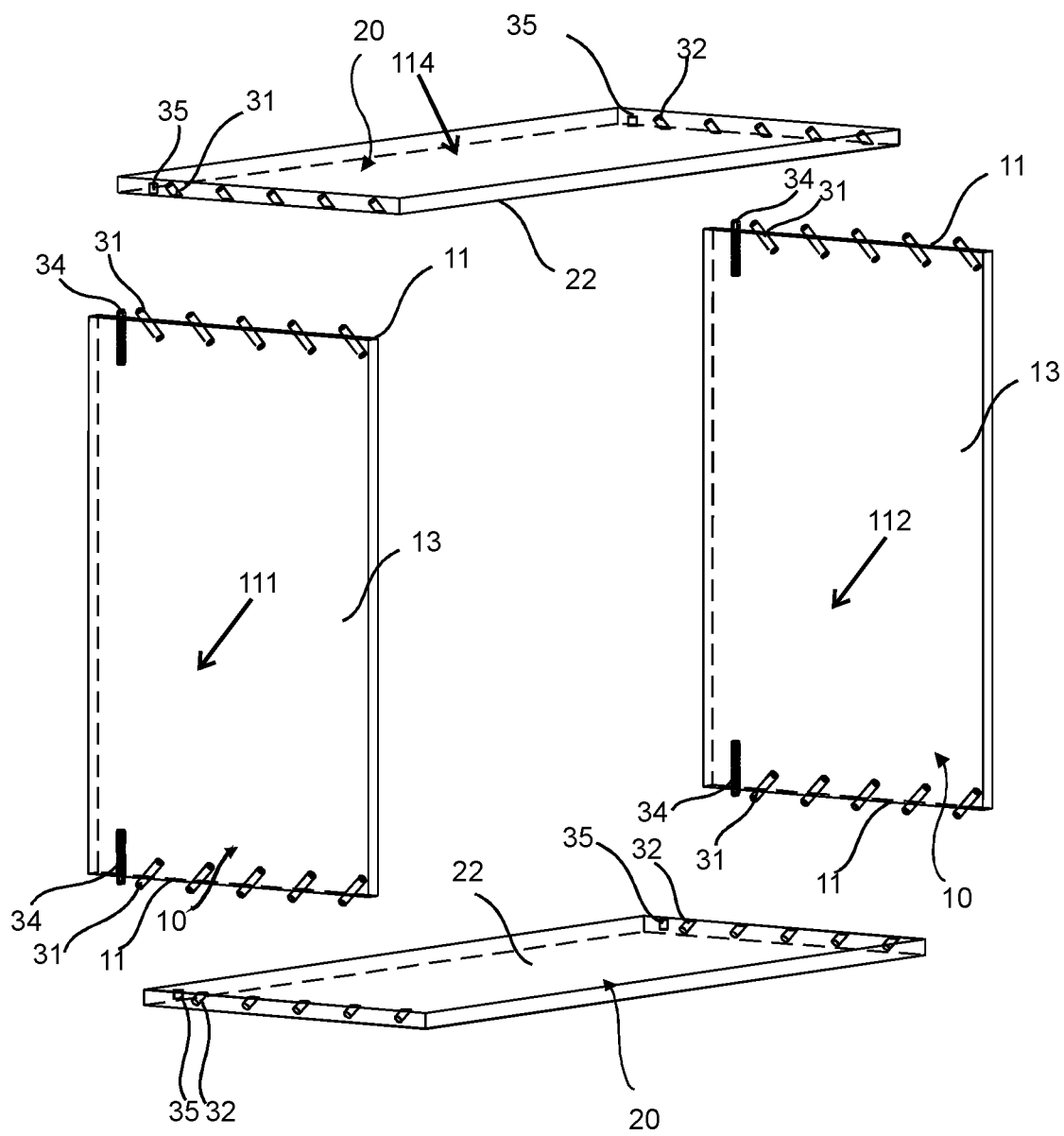
FIG. 16 shows a view of a set comprising two of the first panel, two of the second in an unassembled state of an aspect of the invention.

According to an aspect the first panel 10 and the second panel 20 may be assembled by a displacement of the first panel 10 relative the second panel 20 in an assembly direction which is essentially parallel with the first panel surface 13 as shown in FIGS. 5A, 11 and 16. The mechanical locking device is according to an aspect configured to automatically lock the first panel 10 to the second panel 20 when the rod-shaped element 31 is inserted into the insertion groove 32 and the locking part 34 is inserted into the locking groove 35 and locks against the locking surface 37 by said displacement of the first panel 10 relative the second panel 20. The set may be locked when the first edge surface 11 is arranged against the second panel surface 22.

According to an aspect the first panel 10 may comprise two or more of said first edge surface 11 according to the above. Put in another way, one or more of said rod-shaped elements 31 may be positioned at two or more of the edges of the first panel 10, as disclosed in FIGS. 2-4, 9, 11, 12 and 16.

According to an aspect the second panel 20 may comprise two or more of said fourth edge surface 25 according to the above. Put in another way, one or more of said insertion grooves 32 may be positioned adjacent two or more of the edges of the second panel 10, as disclosed in FIGS. 1-4, 9, 11, 12 and 16.

According to an aspect, as shown in FIG. 11, two of the first panels 10, two of the second panels 20, and one back panel 40 may be assembled.

A left embodiment of the of the first panel 10 may be assembled to a bottom embodiment of the second panel 20 by displacing the left embodiment of the first panel 10 relative the bottom embodiment of the second panel 20 in the assembly direction 111. A right embodiment of the of the first panel 10 may be assembled to the bottom embodiment of the second panel 20 by displacing the right embodiment of the first panel 10 relative the bottom embodiment of the second panel 20 in the assembly direction 112. An embodiment of the back panel 40 may be assembled to the left and right embodiment of the first panel 10 and the bottom embodiment of the second panel 20 by displacing the embodiment of the back panel 40 in an assembly direction 113 which is essentially perpendicular to the second panel surface 22 of the bottom embodiment of the second panel 20. A top embodiment of the second panel 20 may be assembled to the left and right embodiment of the first panel 10 and the embodiment of the back panel 40 by displacing the top embodiment of the second panel 20 in the assembly direction 114.

According to an aspect, as shown in FIG. 16, two of the first panel 10, two of the second panel 20, may be assembled.

A left embodiment of the of the first panel 10 may be assembled to a bottom embodiment of the second panel 20 by displacing the left embodiment of the first panel 10 relative the bottom embodiment of the second panel 20 in the assembly direction 111. A right embodiment of the of the first panel 10 may be assembled to the bottom embodiment of the second panel 20 by displacing the right embodiment of the first panel 10 relative the bottom embodiment of the second panel 20 in the assembly direction 112. A top embodiment of the second panel 20 may be assembled to the left and right embodiment of the first panel 10 and the embodiment of the back panel 40 by displacing the top embodiment of the second panel 20 in the assembly direction 114.

A length 93 of the back panel 40 which in the locked position may be inserted in the panel groove 12 of the first panel 10 may be essentially the same or greater than a length 94 of the first panel 10 at the second edge surface 14 of the first panel. The length 93 of the back panel 40 may be equal to the length 94 of the first panel 10 plus about half the height H1 of the panel groove 12 to about two times the height H1 of the panel groove 12 or equal to the length 94 of the first panel 10 plus the height H1 of the panel groove 12. FIG. 11 shows the length 93 of the back panel 40 which extend between an upper edge 87 of the back panel and a lower edge 88 of the back panel.

Figure 17A:
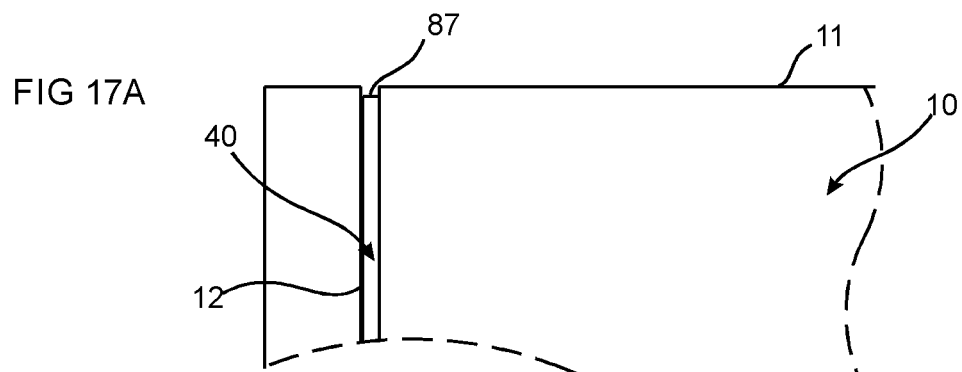
FIGS. 17A-17D show enlargements of parts of a set during assembling.
Figure 17B:
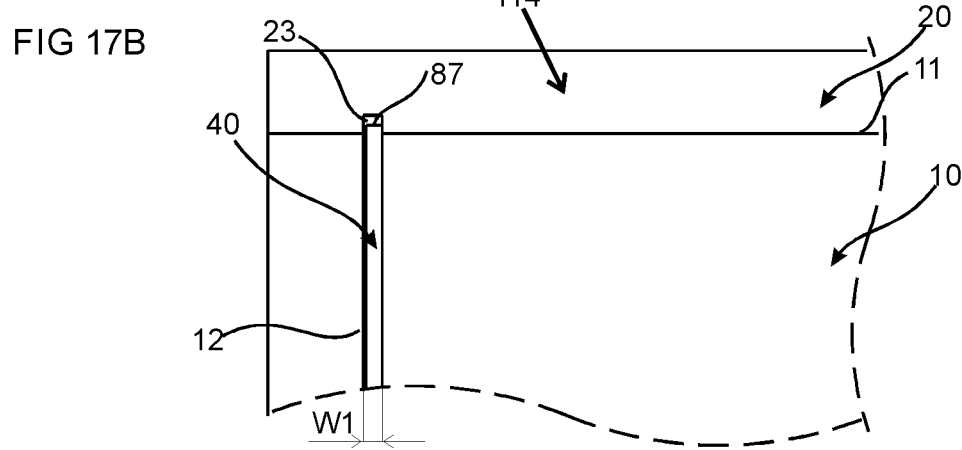
Figure 17C:
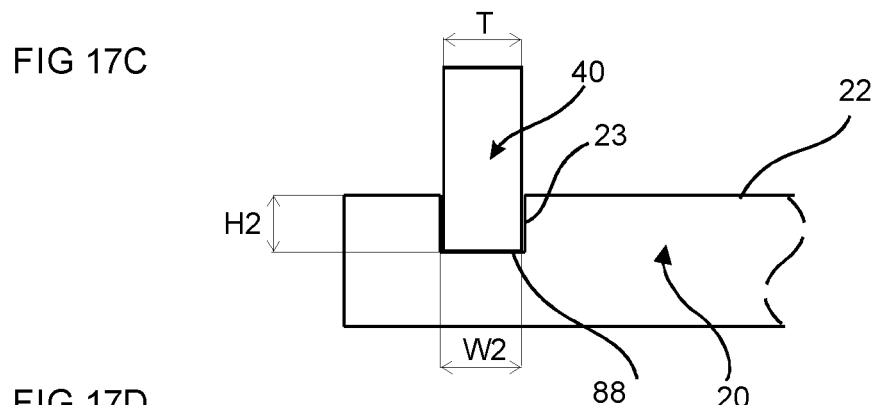

FIGS. 17A-D show enlargements of parts of a set during assembling. FIG. 17A shows an embodiment in a first position in which the back panel 40 is inserted in the panel groove 12 of the first panel 10. The upper edge 87 of the back panel 40 is below the first edge surface 11 of the first panel. FIG. 17C shows that in this first position the lower edge 88 of the back panel may contact a lower surface 89 of the panel groove 23 of the lower second panel 20.

Figure 17D:
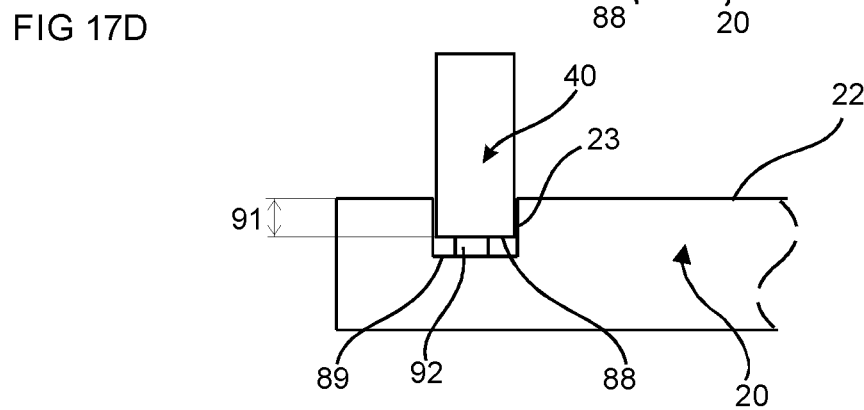

FIG. 17B shows the embodiment in a second position in which, an upper second panel 20 has been displaced 114 and assembled to the first panel 10, and the back panel 40 has been displaced to a position in which the upper edge 87 of the back panel 40 is within the panel groove 23 of the upper second panel 20. FIG. 17D shows that in this second position the lower edge 88 of the back panel may be at a distance 91 from the lower surface 89 of the panel groove 23 of the lower second panel 20. The lower edge 88 of the back panel 40 may be positioned at a distance 91 from the second panel surface 22 of the second panel. The distance may be within the range of about ⅓ to about ⅔ a height H2 of the panel groove 23 of the second panel, or about half the height H2 of the panel groove 23 of the second panel.

The height H2 of the panel groove 23 of the lower second panel groove may be greater than the height H2 of the panel groove 23 of the upper second panel groove. The set may be rotated such that the gravity causes the displacement of the back panel to obtain the position in which the upper edge 87 of the back panel 40 is within the panel groove 23 of the upper second panel 20.

The back panel may be displaced by gravity or by hand and the position in which the upper edge 87 of the back panel 40 is within the panel groove 23 of the upper second panel 20 may be maintained by arranging a positioning element 92 between the panel and the panel groove 12 of the first panel and/or between the back panel and the panel groove 23 of the second panel.

Embodiments of the first panel groove 12 may comprise a width W1 which is essentially the same as a thickness T of the back panel 40. A part of the first panel groove 12 may be wider which may allow an embodiment of the positioning element 50 to be positioned between the back panel and the first panel groove 12 to maintain the position in which the upper edge 87 of the back panel 40 is within the panel groove 23 of the upper second panel 20.

Embodiments of the second panel groove 24 may comprise a width W2 which is essentially the same as a thickness T of the back panel 40. A part of the second panel groove 23 may be wider which may allow an embodiment of the positioning element 50 to be positioned between the back panel 40 and the second panel groove 23 to maintain the position in which the upper edge 87 of the back panel 40 is within the panel groove 23 of the upper second panel 20.

The back panel may be displaceable and the position in which the upper edge 87 of the back panel 40 is within the panel groove 23 of the upper second panel 20 may be maintained by an embodiment of the locking device 4 disclosed in WO2019/125292 or WO2019/125291. The entire contents of WO2019/125292 and WO2019/125291 are hereby incorporated herein by reference in their entirety.

The core of the first panel 10 and/or of the second panel 20 may be a wood-based core, such as MDF, HDF, OSB, WPC, plywood or particleboard. The core may also be a plastic core comprising thermosetting plastic or thermoplastic, e.g., vinyl, PVC, PU or PET. The plastic core may comprise fillers.

The first panel 10 and/or the second panel 20 may also be of solid wood.

The first panel 10 and/or the second panel 20 may be provided with a decorative layer, such as a foil or a veneer, on one or more surfaces.

According to an aspect the set of panels are resilient panels. The resilient panels may comprise a core comprising thermoplastic material. The thermoplastic material may be foamed.

The thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers.

The aspects described above may comprise a decorative layer, such as a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil may be printed, for example by direct printing, rotogravure, or digital printing. According to an aspect the decorative layer comprises melamine, a high pressure laminate (HPL) or a veneer.

The aspects described above may comprise a wear layer such as a film or foil. The wear layer may comprise thermoplastic material. The thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The aspects described above may comprise a wood base core, such as HDF, MDF, plywood, particleboard, OSB or Masonite.

The different aspects, embodiments and alternatives described above may be combined with one or more of the other described aspects, embodiments and alternatives.

Embodiments

1. A set comprising a first panel (10), a second panel (20) and a mechanical locking device for locking the first panel (10) to the second panel (20), wherein
   the first panel (10) comprises a first edge surface (11) and a first panel surface (13),
   the second panel (20) comprises a second panel surface (22),
   the first edge surface (11) is facing or parallel to the second panel surface (22) in a locked position of the first and the second panel (10, 20),
   the mechanical locking device comprises at least one rod-shaped element (31) at the first edge surface (11) and at least one insertion groove (32) at the second panel surface (22),
   the rod-shaped element (31) is configured to cooperate with the insertion groove (32) in the locked position,
   the rod-shaped element (31) extends at a first angle ($\alpha 1$) from the first edge surface (11),
   the insertion groove (32) extends into the second panel surface (22) at a second angle ($\alpha 2$) from the second panel surface (22),
   the mechanical locking device further comprises a locking groove (35) at the second panel surface (22) and a locking part (34) at the first edge surface (11) or a locking groove (35) at the first edge surface (11) and a locking part (34) at the second panel surface (22),
   the locking groove (35) comprises at least one locking surface (37) extending at a third angle ($\beta$) from the first edge surface (11) or from the second panel surface (22),
   the locking part (34) is configured to cooperate with the locking groove (35) and lock against the locking surface (37) in the locked position,
   the third angle ($\beta$) is different than the first angle ($\alpha 1$),
   the first angle ($\alpha 1$) is within the range of about 30° to 60°, or within the range of about 40° to about 50, or about 45, and
   the mechanical locking device is configured to obtain the locked position by displacing first panel (10) relative the second panel (20) in an assembly direction which is essentially parallel with the first panel surface (13).

2. The set as in embodiment 1, wherein the assembly direction (111, 112, 114) is essentially parallel with at least one of the first angle ($\alpha 1$) and the second angle ($\alpha 2$).

3. The set as claimed in embodiment 1 or 2, wherein the third angle ($\beta$) is about 45° to about 90° larger than the first angle ($\alpha 1$).

4. The set as in any one of the preceding embodiments, wherein the third angle ($\beta$) of the locking surface (37) is in the range of about 70° to 110°, or within the range of about 80° to 100%, or within the range of about 85° to 95°, or about 90°.

5. The set as in any one of the preceding embodiments, wherein the locking part (34) is flexible.

6. The set as in any one of the preceding embodiments, wherein the locking part (34), in an unflexed/non-compressed state, is configured to be positioned partly in the locking groove (35).

7. The set as in any one of the preceding embodiments, wherein the locking part (34) comprises a spring.

8. The set as in any one of the preceding embodiments, wherein the locking part (34) is arranged in a locking part groove (38) on the first edge surface (11) or at the second panel surface (22).

9. The set as in claim 8, wherein the locking part (34), in a flexed/compressed state, is configured to be substantially positioned in the locking part groove (38).

10. The set as in any one of the preceding embodiments, wherein at least one of the insertion groove (32) and the locking groove (35) is a drill hole.

11. The set as in claim 10, wherein the drill hole is a bottom-ended drill hole.

12. The set as in any one of the preceding embodiments, wherein the rod-shaped element (31) is arranged in a rod element groove (36) in the first edge surface (11).

13. The set as in any one of the preceding embodiments, wherein set comprises a first panel groove (12) on the first panel surface (13) of the first panel (10), and a second panel groove (23) on the second panel surface (22) of the second panel (20).

14. The set as in claim 13, wherein a width (W1) of the first panel groove (12) is essentially the same as the width (W2) of the second panel groove (23).

15. The set as in any of embodiments 13 to 14, wherein the set further comprises a back panel (40) configured to be inserted in, and optionally to cooperate with, the first and second panel groove (12, 23).

16. The set as in any of embodiments 13 to 15, wherein the first panel (10) comprises a second edge surface (14), the second panel (20) comprises a third edge surface (24), the first panel groove (12) is substantially parallel to the second edge surface (14) and the second panel groove (23) is substantially parallel to the third edge surface (24).

17. The set as in any of embodiments 13 to 16, wherein the first panel groove (12) extends substantially along the entire second edge surface (14) and the second panel groove (23) extends essentially along the entire third edge surface (24).

18. The set as in any of embodiments 13 to 17, wherein at least one of the first panel groove (12) and the second panel groove (23) is bottom-ended.

19. The set as in any of embodiments 16 to 18, wherein an extension (H) of the back panel (40) from the first edge (11) of the first panel (10), when one first panel, one second panel and one back panel have been assembled, is less than an extension of the rod shaped element (31) from the first edge surface (11) of the first panel (10).

The invention claimed is:

1. A set comprising a first panel, a second panel and a mechanical locking device for locking the first panel to the second panel, wherein:
   the first panel comprises a first edge surface and a first panel surface,
   the second panel comprises a second panel surface,
   the first edge surface is facing or parallel to the second panel surface in a locked position of the first and the second panel,
   the mechanical locking device comprises at least one rod-shaped element at the first edge surface and adjacent a front edge of the first panel, and at least one insertion groove at the second panel surface,
   the rod-shaped element is configured to cooperate with the insertion groove in the locked position,
   the rod-shaped element extends at a first angle from the first edge surface,
   the insertion groove extends into the second panel surface at a second angle from the second panel surface,
   the mechanical locking device further comprises a locking groove at the second panel surface and a locking part at the first edge surface and adjacent a back edge of the first panel,
   the rod-shaped element is positioned between the locking part and the front edge,
   the locking groove comprises at least one locking surface extending at a third angle from the second panel surface,
   the locking part is configured to cooperate with the locking groove and lock against the locking surface in the locked position,
   the third angle is different than the first angle, the first angle is within the range of about 30° to 60°,
   the locking part is arranged in a locking part groove on the first edge surface, wherein the locking part is configured to resiliently retract into the locking part groove and is biased to extend in a direction away from a bottom surface of the locking part groove, and
   the first and second panels are configured to become locked by displacing the first panel relative to the second panel surface in an assembly direction which is essentially parallel with the first angle, during which time the rod-shaped element slides into the insertion groove and the locking part resiliently retracts at least partially into the locking part groove via contact between an end surface of the locking part and the second panel surface, at least until the locking part springs into the locking groove such that, in the locked position of the first and second panels, the locking part extends into the locking groove.

2. The set as claimed in claim 1, wherein the locking part comprises a beveled outer edge which is configured to cooperate with an outer edge of the locking groove when the locking part springs into the locking groove.

3. The set as claimed in claim 1, wherein the third angle of the locking surface is in the range of about 70° to 110°.

4. The set as claimed in claim 1, wherein the locking part is flexible.

5. The set as claimed in claim 1, wherein the locking part, in a flexed/compressed state, is configured to be positioned in the locking part groove.

6. The set as claimed in claim 1, wherein the locking part comprises a spring.

7. The set as claimed in claim 1, wherein the rod-shaped element is arranged in a rod element groove in the first edge surface.

8. The set as claimed in claim 7, wherein rod-shaped element is configured to be glued in the rod element groove.

9. The set as claimed in claim 7, wherein rod-shaped element comprises a wood based material.

10. The set as claimed in claim 1, wherein at least one of the insertion groove and the locking groove is a drill hole.

11. The set as claimed in claim 10, wherein the drill hole is a bottom-ended drill hole.

12. The set as claimed in claim 1, wherein the set further comprises a first panel groove on the first panel surface of the first panel and between the locking part and the back edge.

13. The set as claimed in claim 1, wherein set comprises a first panel groove on the first panel surface of the first panel, and a second panel groove on the second panel surface of the second panel.

14. The set as claimed in claim 13, wherein a width of the first panel groove is essentially the same as the width of the second panel groove.

15. The set as claimed in claim 13, wherein the set further comprises a back panel configured to be inserted in, and optionally to cooperate with, the first and second panel grooves.

16. The set as claimed in claim 15, wherein an extension of the back panel from the first edge of the first panel, when the first panel, the second panel and the back panel have been assembled, is less than an extension of the rod shaped element from the first edge surface of the first panel.

17. The set as claimed in claim 13, wherein the first panel comprises a second edge surface, the second panel comprises a third edge surface, the first panel groove is substantially parallel to the second edge surface and the second panel groove is substantially parallel to the third edge surface.

18. The set as claimed in claim 17, wherein the first panel groove extends substantially along the entire second edge surface and the second panel groove extends essentially along the entire third edge surface.

19. The set as claimed in claim 13, wherein at least one of the first panel groove and the second panel groove is bottom-ended.

20. The set as claimed in claim 1, wherein the first and second panels are configured to become locked by sliding the end surface of the locking part along the first or second panel surface, during which time the rod-shaped element slides into the insertion groove and the locking part resiliently retracts at least partially into the locking part groove, at least until the locking part springs into the locking groove in the direction away from the locking part groove such that, in the locked position of the first and second panels, the locking part extends into the locking groove.

* * * * *